(12) United States Patent
Nakamura

(10) Patent No.: US 6,373,327 B1
(45) Date of Patent: Apr. 16, 2002

(54) VOLTAGE GENERATING/TRANSFERRING CIRCUIT

(75) Inventor: Hiroshi Nakamura, Kawasaki (JP)

(73) Assignee: Kabushiki Kaisha Toshiba, Kanagawa-ken (JP)

( * ) Notice: Subject to any disclaimer, the term of this patent is extended or adjusted under 35 U.S.C. 154(b) by 0 days.

(21) Appl. No.: 09/656,831

(22) Filed: Sep. 7, 2000

(30) Foreign Application Priority Data

Sep. 8, 1999 (JP) .......................................... 11-254553

(51) Int. Cl.[7] .............................. G05F 1/10; G05F 3/02
(52) U.S. Cl. ...................................................... 327/536
(58) Field of Search ................................ 327/589, 390, 327/536, 383, 537; 363/60

(56) References Cited

U.S. PATENT DOCUMENTS

| | | | | |
|---|---|---|---|---|
| 4,701,637 A | * | 10/1987 | Piro ........................... 327/536 |
| 4,922,138 A | * | 5/1990 | Hashimoto et al. ......... 327/589 |
| 5,612,921 | | 3/1997 | Chang et al. | 365/226 |
| 5,650,671 A | | 7/1997 | Pascucci et al. ............ 307/110 |
| 5,754,476 A | * | 5/1998 | Caser et al. ............ 365/185.29 |
| 5,767,735 A | | 6/1998 | Javanifard et al. .......... 327/536 |
| 5,926,059 A | | 7/1999 | Brani et al. ................. 327/536 |
| 5,940,284 A | | 8/1999 | Troutman .................... 363/606 |
| 5,973,979 A | | 10/1999 | Chang et al. ............... 365/226 |
| 5,982,224 A | * | 11/1999 | Chung et al. ............... 327/589 |
| 5,994,949 A | | 11/1999 | Menichelli .................. 327/536 |
| 6,100,752 A | * | 8/2000 | Lee et al. .................... 327/536 |

FOREIGN PATENT DOCUMENTS

JP        11-238391        8/1999

* cited by examiner

*Primary Examiner*—Toan Tran
*Assistant Examiner*—Quan Tra
(74) *Attorney, Agent, or Firm*—Banner & Witcoff, Ltd.

(57) ABSTRACT

A plurality of boost units are series-connected. A first MOS transistor is connected between one terminal of the series circuit and a VPP node, and the other terminal of the series circuit is connected to the gate of a second MOS transistor for transferring a boosted voltage. Each boost unit is made up of a third MOS transistor having a gate and drain connected to an input portion and a source connected to an output portion, and a capacitor connected to the input portion. The gate of the first MOS transistor is connected to the input portion of an even-numbered boost unit from the VPP node. This realizes high boosting ability, high voltage transfer capacity, and a low power supply voltage.

12 Claims, 19 Drawing Sheets

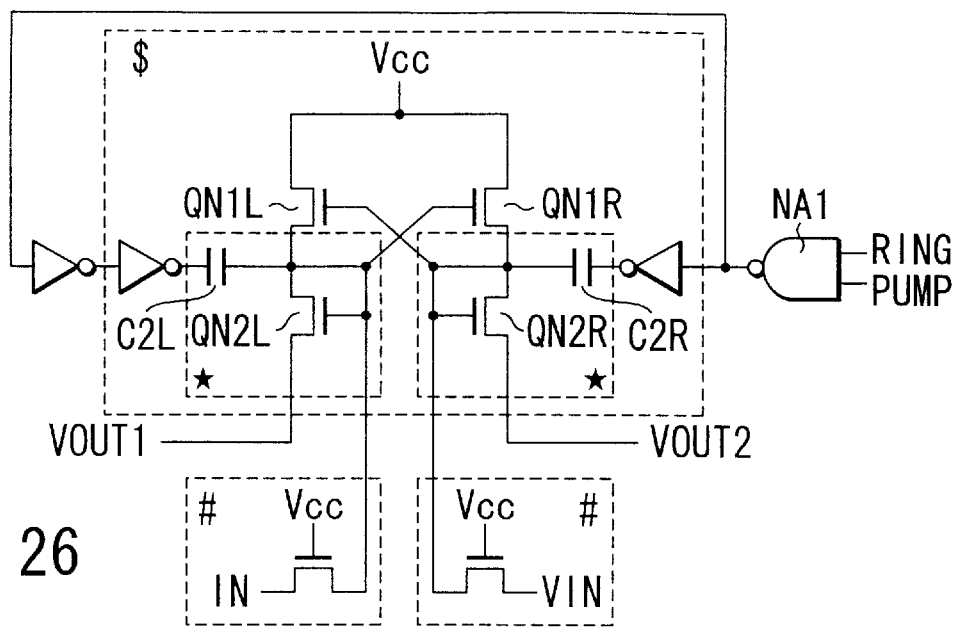
FIG. 26
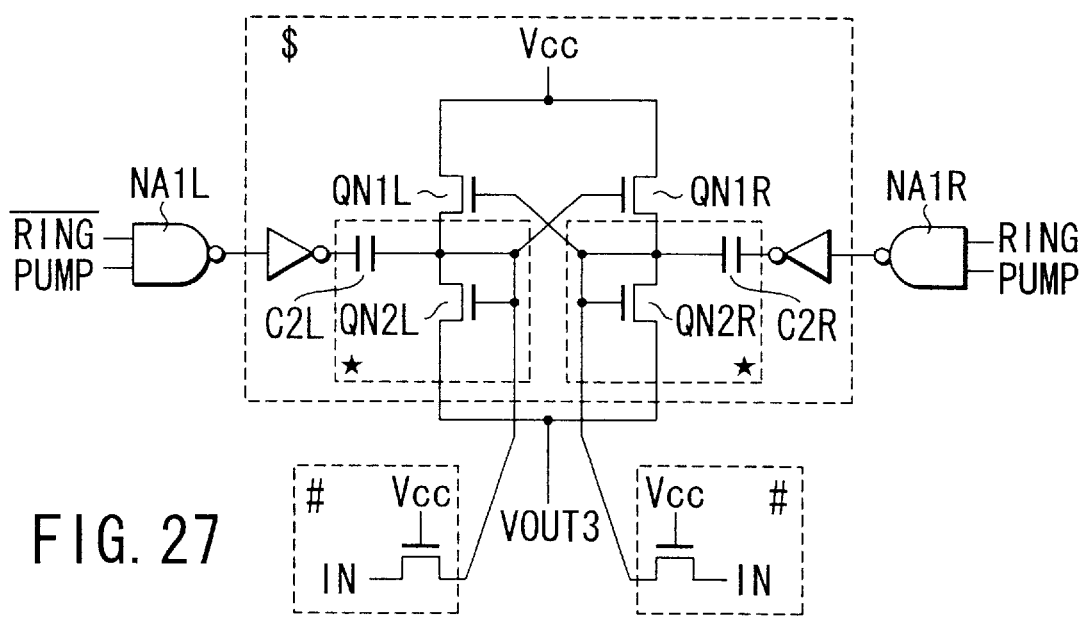
FIG. 27
FIG. 28

VOLTAGE GENERATING/TRANSFERRING CIRCUIT

CROSS-REFERENCE TO RELATED APPLICATIONS

This application is based upon and claims the benefit of priority from the prior Japanese Patent Application No. 11-254553, filed Sep. 8, 1999, the entire contents of which are incorporated herein by reference.

BACKGROUND OF THE INVENTION

The present invention relates to a voltage generating/transferring circuit and, more particularly, to a voltage generating/transferring circuit used for an EEPROM of NAND cell type, NOR cell type, DINOR cell type, or AND cell type.

As is well known, a nonvolatile semiconductor memory represented by an EEPROM must generate a boosted voltage VPP higher than a power supply voltage Vcc in normal operation, e.g., in programming. This boosted voltage VPP is generated by a boosted voltage generating/transferring circuit formed in a memory chip, and transferred to a word line.

In order to generate, transfer, and charge/discharge the boosted voltage VPP, the boosted voltage generating/transferring circuit is formed from a high breakdown voltage type MOS transistor which does not break down even upon application of the boosted voltage VPP.

In the high breakdown voltage type MOS transistor, the thickness and size of a gate insulating film are set to different values from those in a low breakdown voltage type MOS transistor which operates at the power supply voltage Vcc (in general, the gate insulating film of the high breakdown voltage type MOS transistor is thicker than that of the low breakdown voltage type MOS transistor).

Hence, the high breakdown voltage type MOS transistor cannot be manufactured directly using the manufacturing process for the low breakdown voltage type MOS transistor. Manufacturing the high breakdown voltage type MOS transistor requires its own process. This increases the number of steps up to completion of a memory chip, and increases the manufacturing cost.

As the number of types (e.g., N- and P-channel types) of high breakdown voltage type MOS transistors increases, the number of steps of manufacturing process for high breakdown voltage type MOS transistors also increases. To reduce the manufacturing cost, it is desirable to minimize the number of types of high breakdown voltage type MOS transistors and decrease the number of steps up to completion of a memory chip.

For this purpose, a conventional boosted voltage generating/transferring circuit is formed from only high breakdown voltage type N-channel MOS transistors.

FIG. 1 shows an example of the conventional boosted voltage generating/transferring circuit.

In the conventional circuit, high breakdown voltage type MOS transistors QN1, ..., QN3, QN5, and QN6 for receiving the boosted voltage VPP are of N-channel type.

The high breakdown voltage type MOS transistors QN1, ..., QN3 are series-connected to each other. One terminal of the MOS transistor QN1 receives the boosted voltage VPP, whereas one terminal of the MOS transistor QN3 is connected to the gate of the MOS transistor QN6. The MOS transistor QN6 transfers the boosted voltage VPP to a word line.

One terminal of the MOS transistor QN5 receives an input signal IN, its other terminal is connected to the gates of the MOS transistors QN1 and QN6, and its gate receives the power supply voltage Vcc. The gate and drain of each of the MOS transistors QN2 and QN3 are connected to each other. Each of these nodes is connected to one terminal of a corresponding one of capacitors C1 and C2. The MOS transistors QN2 and QN3 and the capacitors C1 and C2 constitute boost units.

Note that one boost unit is surrounded by a dotted line (represented by ★).

A NAND circuit NA1 receives control signals RING and PUMP. An output signal from the NAND circuit NA1 is supplied to the other terminal of the capacitor C1 via an inverter circuit I1, and to the other terminal of the capacitor C2 via inverter circuits I2 and I3.

In this boosted voltage generating/transferring circuit, the boost unit makes the boosted voltage VPP and an output voltage VOUT equal to each other. That is, the boost unit generates a voltage equal to or higher than VPP+Vtn (Vtn is the threshold voltage of the high breakdown voltage type N-channel MOS transistor), and applies this voltage to the gate (node N3) of the high breakdown voltage type MOS transistor QN6. Then, the high breakdown voltage type MOS transistor QN6 can transfer the boosted voltage VPP without any threshold drop (phenomenon in which the transfer potential drops by a threshold value).

If, however, the boosting ability of the boost unit is insufficient, i.e., the voltage of the node N3 is not boosted to VPP+Vtn or more, the output voltage VOUT becomes lower than VPP by the difference between the voltage of the node N3 and VPP+Vtn. As a result, e.g., programming operation fails.

In recent years, the power supply voltage Vcc is decreasing in the EEPROM in order to reduce the power consumption. As the boosting ability of the boost unit in the circuit of FIG. 1 increases with increasing power supply voltage Vcc, a decrease in the power supply voltage Vcc further decreases the boosting ability of the boost unit.

The boosted voltage generating/transferring circuit in FIG. 1 requires development of a technique capable of transferring the boosted voltage VPP without decreasing the boosting ability of the boost unit and causing any threshold drop even if the power supply voltage Vcc is low.

As described above, in the conventional boosted voltage generating/transferring circuit, any decrease in the power supply voltage Vcc decreases the boosting ability of the boost unit for applying a voltage to the gate of a high breakdown voltage type MOS transistor for transferring the boosted voltage VPP. Thus, an excessively low power supply voltage Vcc makes it impossible to transfer the boosted voltage VPP.

BRIEF SUMMARY OF THE INVENTION

It is an object of the present invention to provide a voltage generating/transferring circuit capable of enhancing the boosting ability of a boost unit for generating a voltage to be applied to the gate of a high breakdown voltage type MOS transistor for transferring, e.g., a boosted voltage VPP, and capable of transferring the boosted voltage VPP even if the power supply voltage is low.

A voltage generating/transferring circuit according to the present invention comprises a boost unit group including a plurality of boost units series-connected between an input node and an output node, and a first transistor connected between the input node and a node for receiving a first voltage. Each boost unit has input and output portions, and includes a second transistor having a gate and a drain connected to the input portion and a source connected to the output portion, and a capacitor connected to the input portion. The gate of the first transistor is connected to the input portion of one of the boost units.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 26 is a circuit diagram showing a boosted voltage generating/transferring circuit according to the 19th embodiment of the present invention;

FIG. 27 is a circuit diagram showing a boosted voltage generating/transferring circuit according to the 20th embodiment of the present invention;

FIG. 28 is a circuit diagram showing a transistor for receiving an output signal from the circuit of FIG. 26 or 27 and transferring a boosted voltage;

DETAILED DESCRIPTION OF THE INVENTION

A voltage generating/transferring circuit of the present invention will be described below in detail with reference to the accompanying drawing.

[First Embodiment]

Figure 3:
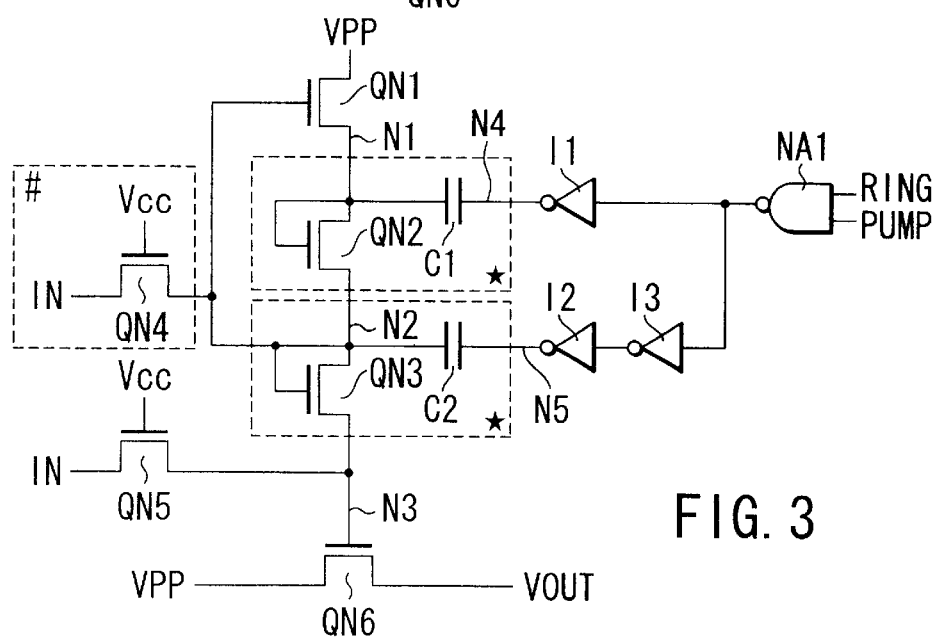
FIG. 3 is a circuit diagram showing a boosted voltage generating/transferring circuit according to the first embodiment of the present invention.

FIG. 3 shows a boosted voltage generating/transferring circuit according to the first embodiment of the present invention.

In the circuit of this embodiment, high breakdown voltage type MOS transistors QN1, QN2, . . . , QN6 for receiving a boosted voltage VPP or neighboring voltage are of N-channel type.

The high breakdown voltage type MOS transistors QN1, . . . , QN3 are series-connected to each other. One terminal of the MOS transistor QN1 receives the boosted voltage VPP, whereas one terminal of the MOS transistor QN3 is connected to the gate of the MOS transistor QN6. One of the roles of the MOS transistor QN6 is to transfer the boosted voltage VPP to a word line.

One terminal of the MOS transistor QN4 receives an input signal IN, its other terminal is connected to the gates of the MOS transistors QN1 and QN3, and its gate receives a power supply voltage Vcc. One terminal of the MOS transistor QN5 receives the input signal IN, its other terminal is connected to the gate of the MOS transistor QN6, and its gate receives the power supply voltage Vcc.

The MOS transistors QN4 and QN5 prevent any leakage current when the circuit is OFF. For example, in the OFF state, the input signal IN is set to a ground potential Vss, and nodes N2 and N3 and the gate of the MOS transistor QN1 are fixed to the ground potential Vss to prevent any leakage current.

The gate and drain of each of the MOS transistors QN2 and QN3 are connected to each other. Each of these nodes is connected to one terminal of a corresponding one of capacitors C1 and C2. The MOS transistors QN2 and QN3 and the capacitors C1 and C2 constitute boost units. One boost unit is surrounded by a dotted line (represented by ★).

A NAND circuit NA1 receives control signals RING and PUMP. An output signal from the NAND circuit NA1 is supplied to the other terminal of the capacitor C1 via an inverter circuit I1, and to the other terminal of the capacitor C2 via inverter circuits I2 and I3.

In this boosted voltage generating/transferring circuit, the boost unit makes the voltage of the VPP node (boosted voltage VPP) and the voltage of the VOUT node (output voltage VOUT) equal to each other. That is, the boost unit generates a voltage equal to or higher than VPP+Vtn (Vtn is the threshold voltage of the high breakdown voltage type N-channel MOS transistor), and applies this voltage to the gate (node N3) of the high breakdown voltage type MOS transistor QN6. Then, the high breakdown voltage type MOS transistor QN6 can transfer the boosted voltage VPP without any threshold drop.

The boost unit boosts a voltage input from the input portion (node connected to the gate and drain of the transistor and the capacitor) by using he capacitor, and outputs the boosted voltage from the output portion (source of the transistor).

The control signal PUMP controls charge/discharge of the other terminal (electrode opposite to a node N1 or N2) of the capacitor C1 or C2.

When the control signal PUMP is at low level (0V), an output signal from the NAND circuit NA1 is fixed to high level (vcc), and the capacitors C1 and C2 do not charge/ discharge. When the control signal PUMP is at high level (Vcc), an output signal from the NAND circuit NA1 is an inverted signal of a level obtained by inverting the level of the control signal RING.

From this, when the control signal RING is oscillating, the capacitors C1 and C2 charge/discharge.

Figure 4:
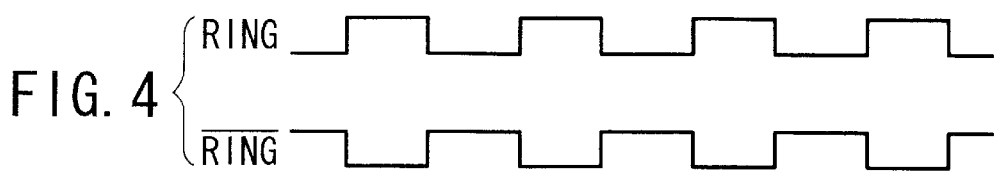
FIG. 4 is a waveform chart showing an example of the waveform of an oscillation signal input to the circuit of FIG. 3.

The control signal RING oscillates in operating the boost unit. An example of the waveform at this time is shown in FIG. 4.

Figure 5:
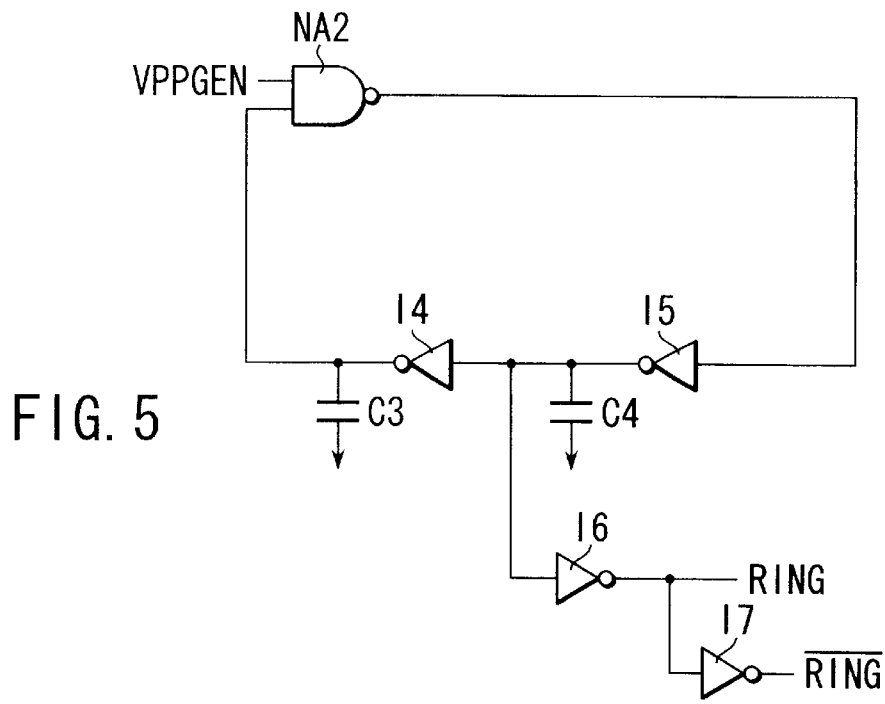
FIG. 5 is a circuit diagram showing an example of a circuit for generating the oscillation signal of FIG. 4.

FIG. 5 shows an example of an oscillator for generating the control signal RING.

This oscillator is made up of a NAND circuit NA2, inverter circuits I4, . . . , I7, and capacitors C3 and C4. In transferring the boosted voltage VPP, i.e., operating the boost unit, a control signal VPPGEN changes to high level (Vcc), and oscillating output signals RING and /RING are output.

In the circuit of FIG. 3, the input signal IN determines whether to transfer a boosted voltage from the MOS transistor QN6.

When the input signal IN is at low level (0V), the nodes N2 and N3 are forcibly set to low level (0V) regardless of the levels of the control signals RING and PUMP. The high breakdown voltage type MOS transistors QN1 and QN6 are turned off, so the boosted voltage VPP is not transferred to the VOUT node.

When the input signal IN is at high level (Vcc), the node N2 changes to Vcc−Vtn (Vtn is the threshold voltage of the high breakdown voltage type N-channel MOS transistor), and charges are transferred from the VPP node to the node N1 via the MOS transistor QN1. At this time, if the control signal PUMP is at high level (Vcc), and the control signal RING is oscillating, the voltages of the nodes N2 and N3 are boosted. As a result, the voltage of the node N3 rises to VPP+Vtn or more, and the boosted voltage VPP is transferred to the VOUT node via the MOS transistor QN6 without any threshold drop.

Figure 6:
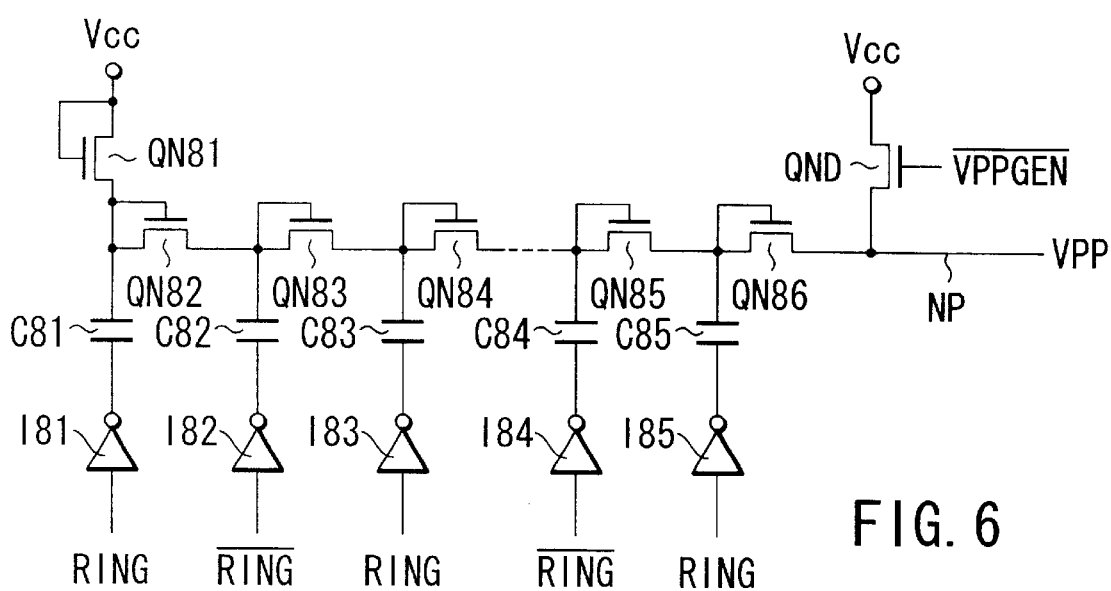
FIG. 6 is a circuit diagram showing an example of a boosted voltage generating circuit.

FIG. 6 shows an example of the boosted voltage generating circuit.

This circuit is comprised of a plurality of N-channel MOS transistors QN81, QN82, . . . , QN86 series-connected between a power supply voltage Vcc terminal and a VPP node NP, a depletion MOS transistor QND whose gate receives a control signal/VPPGEN, inverter circuits I81, I82, . . . , I85, and capacitors C81, C82, . . . , C85.

When the control signals VPPGEN and /VPPGEN are at high level (Vcc) and low level (0V), respectively, the oscillator in FIG. 5 generates the control signals RING and /RING having the waveforms in FIG. 4, thereby activating the boosted voltage generating circuit in FIG. 6. Consequently, the boosted voltage VPP is output to the VPP node. This boosted voltage VPP is applied to, e.g., the boosted voltage generating/transferring circuit in FIG. 3.

The advantages of the boosted voltage generating/transferring circuit shown in FIG. 3 will be explained.

Figure 1:
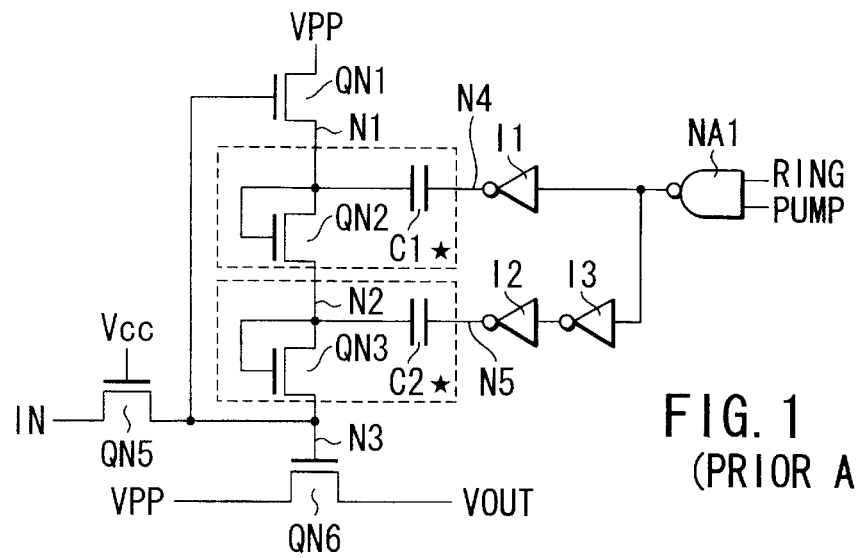
FIG. 1 is a circuit diagram showing a conventional boosted voltage generating/transferring circuit.

A comparison of the circuit of FIG. 3 with the circuit (prior art) of FIG. 1 reveals that the gate of the MOS transistor QN1 is connected to different nodes in these circuits. The gate of the MOS transistor QN1 is connected to the node N2 in the circuit of FIG. 3, but to the node N3 in the circuit of FIG. 1.

In this case, the circuit of FIG. 3 can set higher voltage applicable to the gate of the MOS transistor QN1, than the circuit of FIG. 1. In other words, since the charge amount transferred from the VPP node to the node N1 can be increased, the boosting ability of the boost unit can be enhanced.

The circuit of FIG. 3 has the following two features:

① The ultimate gate voltage of the MOS transistor QN1 is high.

② The gate and source voltage levels of the MOS transistor QN1 gradually rise while changing in opposite phases (timing at which the voltage level of the gate of the transistor QN1 maximizes is the timing at which the voltage level of the source (corresponding to the node N1) of the transistor QN1 drops).

The reason of condition ① will be explained.

When the circuit of FIG. 1 or 3 is ON, the voltage levels of the nodes N1, N2, and N3 gradually rise in synchronism with clock signals output from the NAND circuit NA1. Of the nodes N1, N2, and N3, the node N2 exhibits the highest ultimate voltage.

The reason for this is as follows. The voltage levels of the nodes (input portions of the boost units) N1 and N2 respectively connected to the capacitors C1 and C2 gradually rise in synchronism with clock signals output from the NAND circuit NA1. Since the boost unit on the MOS transistor QN6 side receives an output voltage from the boost unit on the MOS transistor QN1 side, the voltage level of the node N2 naturally becomes higher than that of the node N1. The voltage level of the node N3 becomes lower than that of the node N2 by the threshold voltage of the MOS transistor QN3. Accordingly, the node N2 has the highest voltage among the nodes N1, N2, and N3.

The voltage levels of nodes N4 and N5 repeat high and low levels (the voltage levels of the nodes N4 and N5 are in opposite phases). Along with this, the voltage levels of the nodes N1 and N2 also repeat high and low levels, and gradually rise.

The node N2 reaches the highest voltage (ultimate voltage) Vn2max when the node N5 is at high level (if the voltage level of the node N5 changes to high level owing to capacitive coupling by the capacitor C2, the voltage level of the node N2 also changes to high level).

The ultimate voltage Vn3max of the node N3 is Vn2max−Vtn (Vtn is the threshold voltage of the MOS transistor QN3, and generally falls within the range Vtn>0).

Thus, the node having the highest ultimate voltage is the node N2, which is connected to the gate of the MOS transistor QN1. Accordingly, the ultimate voltage of the gate of the MOS transistor QN1 is high, which satisfies condition ①.

The reason of condition ② will be explained.

The voltage levels of the nodes N4 and N5 repeat high and low levels in synchronism with the clock signal RING (the voltage levels of the nodes N4 and N5 are in opposite phases). As the voltage levels of the nodes N4 and N5 change, those of the nodes N1 and N2 also repeat high and low levels.

That is, if the voltage level of the node N4 becomes high, that of the node N1 also becomes high due to capacitive coupling by the capacitor C1. If the voltage level of the node N5 becomes high, that of the node N2 also becomes high due to capacitive coupling by the capacitor C2. The high- and low-level values of the nodes N1 and N2 gradually increase.

On the other hand, the voltage levels of the nodes N4 and N5 are in opposite phases. Thus, the voltage levels of the nodes N1 and N2 are also in opposite phases. In other words, when the gate (node N2) of the MOS transistor QN1 is at high level, its source (node N1) is at low level.

In the circuit of FIG. 3, the voltage levels of the gate (node N2) and source (node N1) of the MOS transistor QN1 gradually rise while changing in opposite phases.

If the gate (node N2) of the MOS transistor QN1 is at high level in boosting operation, its source (node N1) is at low level. A sufficiently high potential difference is applied between the gate and source of the MOS transistor QN1, so the charge transfer amount in the MOS transistor QN1 increases to enhance the boosting ability.

In this manner, the ultimate voltage of the gate of the MOS transistor QN1 is set high on the basis of condition ①, and the source of the MOS transistor is set low when its gate is at high level on the basis of condition ②. As a result, a sufficiently high voltage can be applied between the gate and source of the MOS transistor QN1. The charge transfer amount from the VPP node to the node N1 can be increased to enhance the boosting ability of the boost unit, i.e., increase the voltage level (Vn3max level) of the node N3.

Charges are transferred from the VPP node to the MOS transistor QN1 when the node N4 is at low level, i.e., the node N5 is at high level. As the charge transfer amount is larger, the voltage boosting ability of the boost unit in the circuit of FIG. 1 or 3 is higher, and the ultimate voltage Vn3max of the node N3 is higher. At the same time, the ultimate voltage Vn2max (>Vn3max) of the node N2 is also higher.

Setting high Vn3max level can enhance the voltage transfer capacity of the MOS transistor QN6. The boosted voltage VPP can be transferred to the VOUT node at high speed without any threshold drop.

In the circuit of FIG. 3, the boosting ability of the boost unit is higher than in the circuit of FIG. 1. The boosted voltage VPP can be transferred, and the power supply voltage Vcc serving as the generation source of the boosted voltage VPP can be set low.

As described above, the present invention can achieve high boosting ability of the boost unit and a wide settable range of the power supply voltage Vcc.

If a plurality of boost units exist, the operation timings of oscillation signals for driving odd-numbered boost units counted from the MOS transistor QN1 are generally the same (in this embodiment, coincide with the timing of the control signal RING). Similarly, the operation timings of oscillation signals for driving even-numbered boost units counted from the MOS transistor QN1 are generally the same (in this embodiment, coincide with the timing of the control signal/RING).

To satisfy condition ②, the input portion (corresponding to a node between the gate and drain of a MOS transistor and a capacitors) of an even-numbered boost unit counted from the MOS transistor QN1 is connected to the gate of the MOS transistor QN1.

Figure 2:
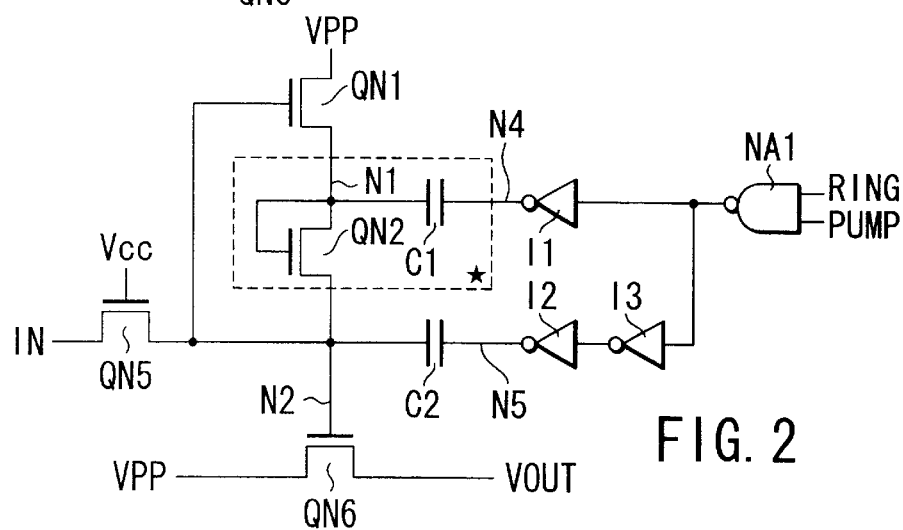
FIG. 2 is a circuit diagram showing a boosted voltage generating/transferring circuit as a reference example of the present invention.

The circuit (reference example) of FIG. 2 is a modification of the circuit of FIG. 1. Similar to the circuit of FIG. 3 according to the present invention, the circuit of FIG. 2 satisfies condition ②. For effect ①, the circuit of FIG. 2 is inferior to the circuit of FIG. 3.

In the circuits of FIGS. 3 and 2, the gate of the MOS transistor QN1 is connected to the node N2 (source of the transistor QN2), and the node N2 is connected to four MOS transistors (since the capacitor C1 is formed from a MOS capacitor, it is counted as one MOS transistor).

In the circuit of FIG. 2, one of the four MOS transistors connected to the node N2 is the MOS transistor QN6 for transferring the boosted voltage VPP. Since the VOUT node has a very large capacitance, the MOS transistor QN6 is generally set larger in size than other MOS transistors.

Hence, the capacitance of the node N2 is larger in the circuit of FIG. 2 than in the circuit of FIG. 3. As a result, voltage increments ΔVn2 at the nodes N2 when the nodes N5 change from low level to high level satisfy ΔVn2 (FIG. 3)>ΔVn2 (FIG. 2).

For ΔVn2 (FIG. 3)=ΔVn2 (FIG. 2) to hold, the capacitor C2 in the circuit of FIG. 2 must be set larger in size than that in the circuit of FIG. 3. In this case, the area of the boosted voltage generating/transferring circuit increases in the circuit of FIG. 2.

Compared to the circuits of FIGS. 1 and 2, using the circuit of FIG. 3 can realize high boosting ability of the boost unit (increase the Vn3max level), high transfer capacity for the boosted voltage VPP, and a low power supply voltage Vcc.

Figure 7:
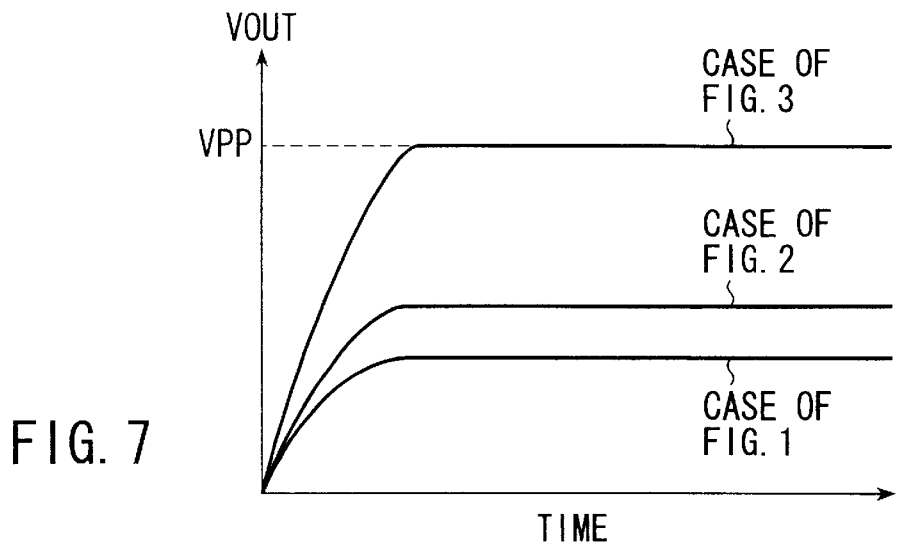
FIG. 7 is a graph showing comparison in boosted voltage transfer capacity between the prior art and the present invention.

FIG. 7 shows a comparison in the transfer capacity for the boosted voltage VPP between the present invention (FIG. 3), the prior art (FIG. 1), and the reference example (FIG. 2).

FIG. 7 shows a change (charge waveform) in output potential (potential at the VOUT node) VOUT when the boosted voltage generating/transferring circuit is operated at a low power supply voltage Vcc.

Since the circuits of FIGS. 1 and 2 assume operation at a low power supply voltage, the boosted voltage VPP cannot be satisfactorily transferred and the output voltage VOUT is lower than the boosted voltage VPP in these circuits. To the contrary, in the circuit of FIG. 3, the boosting ability of the boost unit is increased and the output voltage VOUT can be set to the boosted voltage VPP.

[Second Embodiment]

Figure 8:
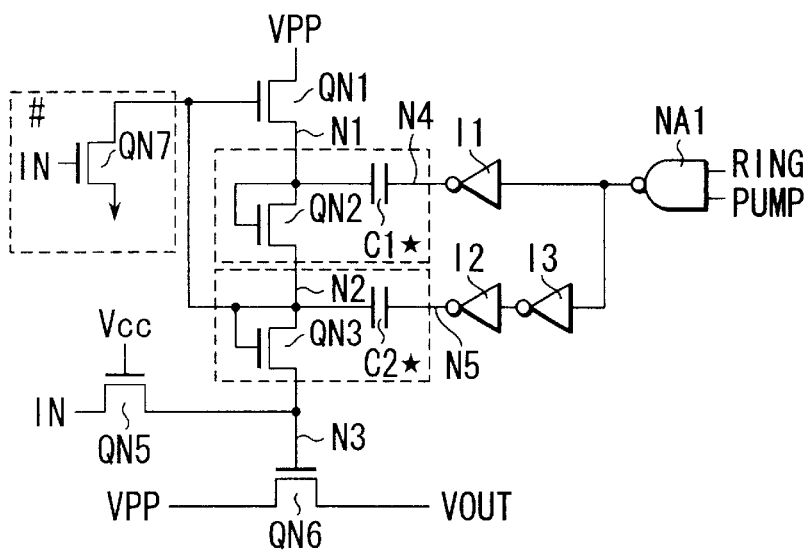
FIG. 8 is a circuit diagram showing a boosted voltage generating/transferring circuit according to the second embodiment of the present invention.

FIG. 8 shows a boosted voltage generating/transferring circuit according to the second embodiment of the present invention.

Compared to the circuit of FIG. 3, the circuit of this embodiment is characterized by a section # surrounded by a dotted line. That is, the gate of an N-channel MOS transistor QN7 receives an input signal /IN, its source is grounded, and its drain is connected to the gates of N-channel MOS transistors QN1 and QN3. The input signal /IN is an inverted signal having a voltage level prepared by inverting the voltage level of an input signal IN.

A MOS transistor QN5 and the N-channel MOS transistor QN7 have the same role as that of the MOS transistors QN4 and QN5 in FIG. 3. When the circuit is OFF, the MOS transistors QN5 and QN7 fix nodes N2 and N3 and the gate of the MOS transistor QN1 to a ground potential Vss to prevent any leakage current.

The structure except for the # section within the dotted line is the same as in the circuit of FIG. 3. That is, the MOS transistors QN1, . . . , QN3 are series-connected to each other. One terminal of the MOS transistor QN1 receives a boosted voltage VPP, whereas one terminal of the MOS transistor QN3 is connected to the gate of a MOS transistor QN6.

One terminal of the MOS transistor QN5 receives the input signal IN, its other terminal is connected to the gate of the MOS transistor QN6, and its gate receives a power supply voltage Vcc. The gate and drain of each of the MOS transistors QN2 and QN3 are connected to each other. Each of these nodes is connected to one terminal of a corresponding one of capacitors C1 and C2. The MOS transistors QN2 and QN3 and the capacitors C1 and C2 constitute boost units (represented by ★).

A NAND circuit NA1 receives control signals RING and PUMP. An output signal from the NAND circuit NA1 is supplied to the other terminal of the capacitor C1 via an inverter circuit I1, and to the other terminal of the capacitor C2 via inverter circuits I2 and I3.

The circuit of this embodiment also has the two features described in the circuit of FIG. 3, i.e., ① "the ultimate voltage of the gate of the transistor QN1 is high", and ② "the gate and source voltage levels of the transistor QN1 gradually rise while changing in opposite phases". Using the circuit of this embodiment can realize high boosting ability of the boost unit (increase the Vn3max level), high transfer capacity for the boosted voltage VPP, and a low power supply voltage Vcc without increasing the circuit area.

[Third Embodiment]

Figure 9:
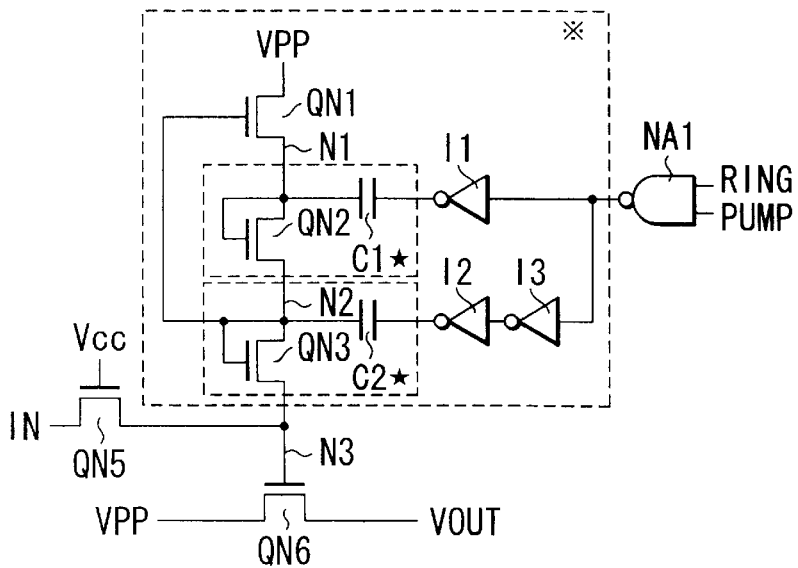
FIG. 9 is a circuit diagram showing a boosted voltage generating/transferring circuit according to the third embodiment of the present invention.

FIG. 9 shows a boosted voltage generating/transferring circuit according to the third embodiment of the present invention.

Compared to the circuit of FIG. 3, the circuit of this embodiment is characterized by omitting the transistor QN4 in the section # surrounded by the dotted line in FIG. 3.

The transistor QN4 in the section # surrounded by the dotted line in FIG. 3 is adopted to prevent generation of any leakage current in the OFF state. If, however, the leakage current is small to a negligible level in circuit operation, the transistor QN4 in the section # surrounded by the dotted line in FIG. 3 can be omitted to decrease the total number of MOS transistors constituting the circuit and reduce the circuit area.

Except for the presence/absence of the transistor QN4, the circuit of FIG. 9 is the same as the circuit of FIG. 3. That is, MOS transistors QN1, . . . , QN3 are series-connected to each other. One terminal of the MOS transistor QN1 receives a voltage equal to or in the neighborhood of a boosted voltage VPP, whereas one terminal of the MOS transistor QN3 is connected to the gate of a MOS transistor QN6. The gates of the transistors QN1 and QN3 are connected to each other.

One terminal of a MOS transistor QN5 receives an input signal IN, its other terminal is connected to the gate of the MOS transistor QN6, and its gate receives a power supply voltage Vcc. The gate and drain of each of the MOS transistors QN2 and QN3 are connected to each other. Each of these nodes is connected to one terminal of a corresponding one of capacitors C1 and C2. The MOS transistors QN2 and QN3 and the capacitors C1 and C2 constitute boost units (represented by ★).

A NAND circuit NA1 receives control signals RING and PUMP. An output signal from the NAND circuit Na1 is supplied to the other terminal of the capacitor C1 via an inverter circuit I1, and to the other terminal of the capacitor C2 via inverter circuits I2 and I3.

The circuit of this embodiment also has the two features described in the circuit of FIG. 3, i.e., ① "the ultimate voltage of the gate of the transistor QN1 is high", and ② "the gate and source voltage levels of the transistor QN1 gradually rise while changing in opposite phases". Using the circuit of this embodiment can realize high boosting ability of the boost unit (increase the Vn3max level), high transfer capacity for the boosted voltage VPP, and a low power supply voltage Vcc without increasing the circuit area.

The circuit of the third embodiment does not use any element for fixing the gate of the transistor QN1 to 0V when the input signal IN is at low level (0V). However, the node N3 is fixed to 0V when the input signal IN is at low level (0V), so a leakage current generated in the path of the transistors QN1, QN2, QN3, and QN5 does not increase to a large value.

In this fashion, when the leakage current is negligibly small, or the circuit normally operates even in the presence of a small leakage current, the circuit of this embodiment can be actually used.

The circuit of the third embodiment is more advantageous than the circuits of FIGS. 3 and 8 because the number of elements (transistors) is smaller by one. This can reduce the area of the boosted voltage generating/transferring circuit.

[Fourth Embodiment]

Figure 10:
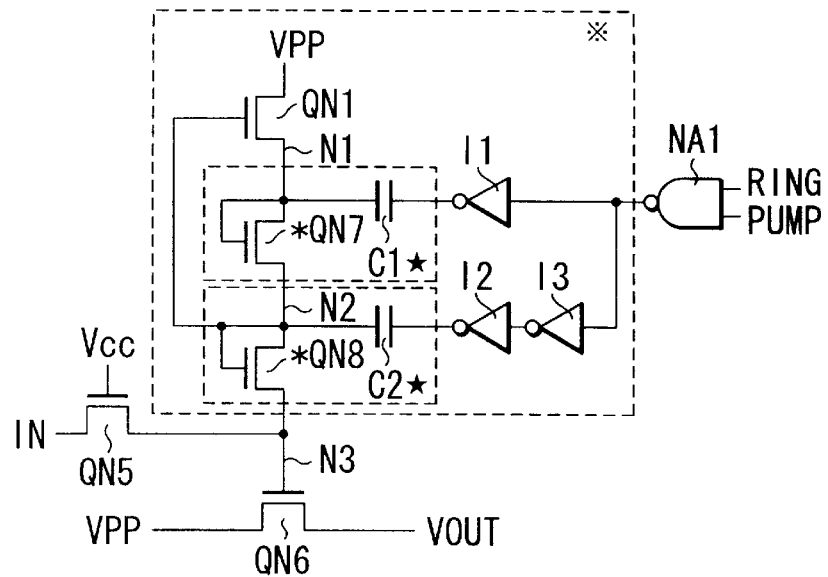
FIG. 10 is a circuit diagram showing a boosted voltage generating/transferring circuit according to the fourth embodiment of the present invention.

FIG. 10 shows a boosted voltage generating/transferring circuit according to the fourth embodiment of the present invention.

The circuit of this embodiment has the same circuit structure as that of the circuit of FIG. 9. In the circuit of FIG. 10, the threshold voltage of a MOS transistor in a boost unit (represented by ★) is set lower than that of another MOS transistor.

More specifically, transistors *QN7 and *QN8 (* represents a transistor whose threshold voltage is low) replace the transistors QN2 and QN3 in the boost units of FIG. 9.

Similar to the circuit of FIG. 9, the circuit of the fourth embodiment can realize high boosting ability of the boost unit (increase the Vn3max level), high transfer capacity for the boosted voltage VPP, and a low power supply voltage Vcc without increasing the circuit area.

The circuit of this embodiment does not adopt any element for directly fixing a node N2 to 0V when the input signal IN is at low level (0V). However, when the input signal IN is at low level (0V), the threshold voltage of the transistor *QN8 between the node N2 and a node N3 fixed to 0V is low.

This can reduce a leakage current generated in the path of a transistor QN1 and the transistors *QN7, *QN8, and QN5. Since the node N3 is at 0V, the voltage of the node N2 is Vtn* (Vtn* is the threshold voltage of the transistor *QN8), and the gate voltage of the transistor QN1 is also Vtn*.

In this case, the threshold voltage Vtn of the transistor QN1 is higher than Vtn* (Vtn>Vtn*).

No current flows through the transistor QN1, and the leakage current can be reduced more greatly than in the circuit of FIG. 9.

The circuit of the fourth embodiment is more advantageous than the circuit of FIG. 9 because the leakage current can be reduced. In the circuit of this embodiment, similar to the circuit of FIG. 9, the number of elements (transistors) is smaller by one than in the circuit of FIG. 1. This can reduce the area of the boosted voltage generating/transferring circuit.

Since the threshold voltage Vtn* of the transistors *QN7 and *QN8 in the boost units is set lower than the threshold voltage Vtn of another transistor, the boosting ability of the boost unit is higher than in the circuit of FIG. 9.

Compared to the circuit of FIG. 9, the circuit of the fourth embodiment is advantageous in the transfer capacity for the boosted voltage VPP and can further decrease the power supply voltage Vcc.

In the fourth embodiment, the threshold voltages of the *QN7 and *QN8 in all the boost units are set low. When the boosted voltage generating/transferring circuit is constituted by a plurality of boost units, the threshold voltage of a transistor in at least one boost unit suffices to be set low. Even this setting can reduce the leakage current, increase the transfer capacity for the boosted voltage VPP, and decrease the power supply voltage vcc.

If the threshold voltage of a transistor in at least one boost unit is set low in the circuits of FIGS. 3 and 8, the circuits of FIGS. 3 and 8 can also attain the same effects as those in the circuit of the fourth embodiment.

In this manner, it is effective to use a MOS transistor having a low threshold voltage as a MOS transistor in the boost unit. In particular, the threshold voltage of a MOS transistor in a boost unit on the node N3 side on which the source voltage is high (i.e., the substrate bias effect is large), which can down the threshold voltage of the element having a large back-gate bias effect and up the boost ability.

The first to fourth embodiments employ a method of transferring the voltage of the VPP node (boosted voltage VPP) to the VOUT node via the MOS transistor QN6. However, the present invention is not limited to a boosted voltage generating/transferring circuit using this method, and can also be applied to a boosted voltage generating/transferring circuit for generating and transferring the boosted voltage VPP by another method.

[Fifth Embodiment]

Figure 11:
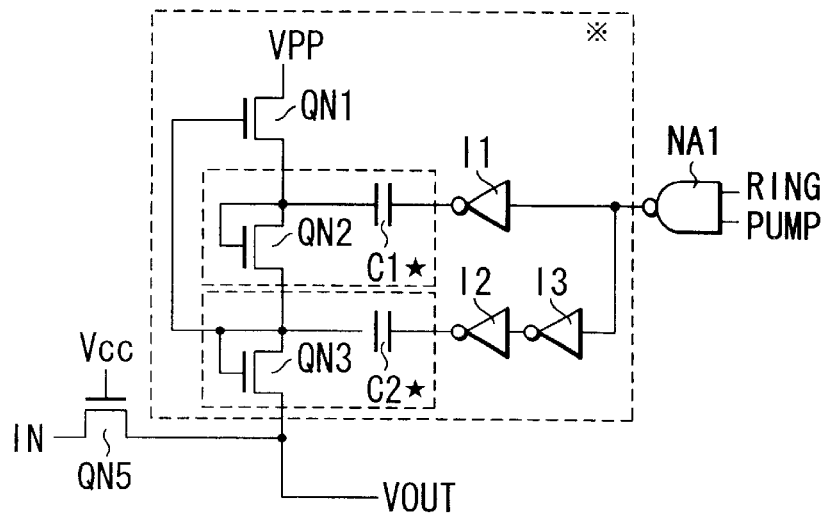
FIG. 11 is a circuit diagram showing a boosted voltage generating/transferring circuit according to the fifth embodiment of the present invention.

FIG. 11 shows a boosted voltage generating/transferring circuit according to the fifth embodiment of the present invention.

The circuit of this embodiment is a modification of the circuit of FIG. 9, and adopts a method of transferring a boosted voltage to the VOUT node.

A section (represented by ✖) surrounded by a dotted line is the same as the section (represented by ✖) surrounded by a dotted line in the circuit of FIG. 9.

MOS transistors QN1, . . . , QN3 are series-connected to each other. One terminal of the MOS transistor QN1 receives a voltage equal to or in the neighborhood of a boosted voltage VPP, whereas one terminal of the MOS transistor QN3 is connected to the VOUT node. The gates of the transistors QN1 and QN3 are connected to each other.

One terminal of a MOS transistor QN5 receives an input signal IN, its other terminal is connected to the VOUT node, and its gate receives a power supply voltage Vcc. The gate and drain of each of the MOS transistors QN2 and QN3 are connected to each other. Each of these nodes is connected to one terminal of a corresponding one of capacitors C1 and C2. The MOS transistors QN2 and QN3 and the capacitors C1 and C2 constitute boost units (represented by ★).

A NAND circuit NA1 receives control signals RING and PUMP. An output signal from the NAND circuit NA1 is supplied to the other terminal of the capacitor C1 via an inverter circuit I1, and to the other terminal of the capacitor C2 via inverter circuits I2 and I3.

The circuit of the fifth embodiment uses a method of directly outputting a voltage generated in the boost unit to the VOUT node. In the circuit of this embodiment, the transistor QN6 in the circuit of FIG. 9 is omitted, and the node N3 is directly connected to the VOUT node. Thus, the VOUT node receives a voltage higher than the boosted voltage VPP.

The circuit of this embodiment also has the two features described in the circuit of FIG. 3, i.e., ① "the ultimate voltage of the gate of the transistor QN1 is high", and ② "the gate and source voltage levels of the transistor QN1 gradually rise while changing in opposite phases". Using the circuit of this embodiment can realize high boosting ability of the boost unit (increase the Vn3max level), high transfer capacity for the boosted voltage VPP, and a low power supply voltage Vcc without increasing the circuit area.

In the fifth embodiment, the section (represented by ✖) surrounded by the dotted line has the same circuit structure as that of the circuit of FIG. 9, but may have the same circuit structure as that of the circuit of FIG. 10 (characterized in that the threshold of a transistor in the boost unit is set low). In this case, similar to the circuit of FIG. 10, the circuit of the fifth embodiment can reduce any leakage current, increase the transfer capacity for the boosted voltage VPP, decrease the power supply voltage Vcc, and reduce the number of elements.

In the fifth embodiment, the section (represented by ✖) surrounded by the dotted line may have the same circuit structure as that of the circuit of FIG. 3 or 8. In this case, the current consumption can be reduced by preventing the leakage current.

[Sixth Embodiment]

Figure 12:
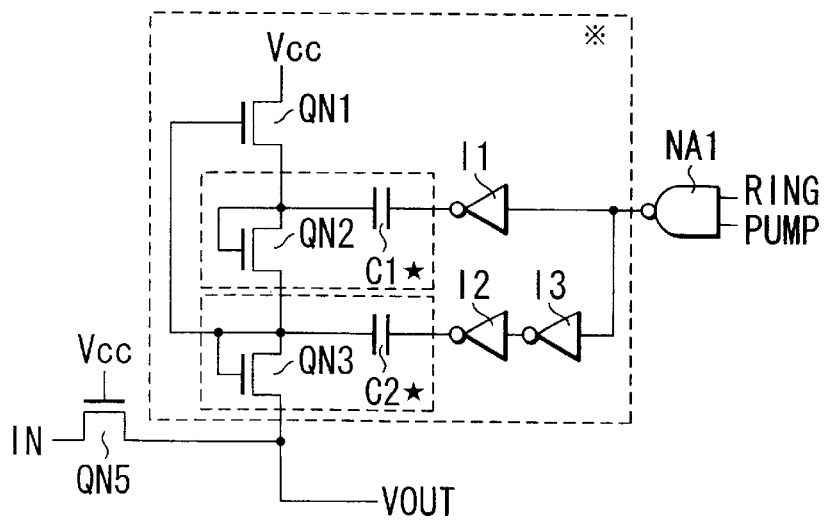
FIG. 12 is a circuit diagram showing a boosted voltage generating/transferring circuit according to the sixth embodiment of the present invention.

FIG. 12 shows a boosted voltage generating/transferring circuit according to the sixth embodiment of the present invention.

The circuit of this embodiment has the same circuit structure as that of the circuit of FIG. 11. The circuit of the sixth embodiment is different from that of FIG. 11 in that the drain of a transistor QN1 receives not a boosted voltage VPP but a power supply voltage Vcc.

In the circuit of the sixth embodiment, as well as the circuit of FIG. 11, a voltage generated in the boost unit is directly output to the VOUT node. In general, this voltage is higher than the power supply voltage Vcc.

Also, the circuit of this embodiment can realize high boosting ability of the boost unit (increase the Vn3max level), high transfer capacity for the boosted voltage VPP, and a low power supply voltage Vcc without increasing the circuit area as well as the circuit of FIG. 11.

In the sixth embodiment, a section (represented by ✖) surrounded by a dotted line may have the same circuit structure as that of the circuit of FIG. 10 (characterized in that the threshold of a transistor in the boost unit is set low). In this case, similar to the circuit of FIG. 10, the circuit of the sixth so embodiment can reduce any leakage current, increase the transfer capacity for the boosted voltage VPP, decrease the power supply voltage Vcc, and reduce the number of elements.

In the sixth embodiment, the section (represented by ✖) surrounded by the dotted line may have the same circuit structure as that of the circuit of FIG. 3 or 8. In this case, the current consumption can be reduced by preventing the leakage current. Modifications of the sections (represented by ✖) surrounded by the dotted lines in the third to sixth embodiments (FIGS. 9, 10, 11 and 12) will be explained.

In the third to sixth embodiments, the boosted voltage generating/transferring circuit is made up of two boost units. In the following embodiments, a capacitor and another boost unit are newly added to two boost units.

[Seventh Embodiment]

Figure 13:
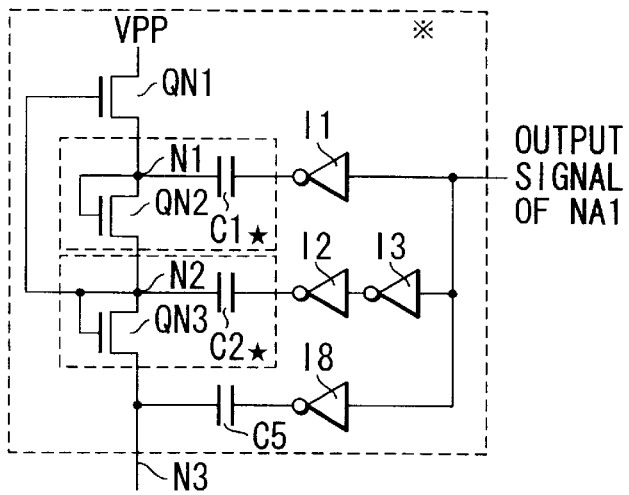
FIG. 13 is a circuit diagram showing a boosted voltage generating/transferring circuit according to the seventh embodiment of the present invention.

FIG. 13 shows a boosted voltage generating/transferring circuit according to the seventh embodiment of the present invention.

The circuit of this embodiment is characterized in that a capacitor C5 and inverter circuit I8 are series-connected between the output terminal of a NAND circuit and a node N3. In this case, the voltage levels of nodes N1 and N3 gradually change while changing in phase in synchronism with an output signal from a NAND circuit NA1. The voltage level of a node N2 and those of the nodes N1 and N3 are in opposite phases.

[Eighth Embodiment]

Figure 14:
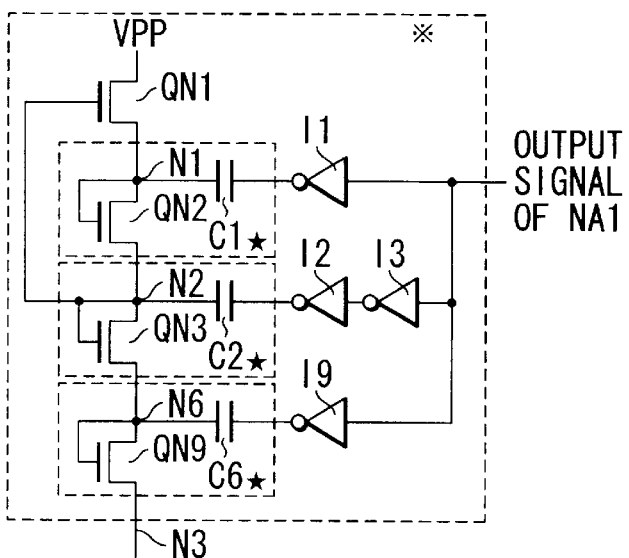
FIG. 14 is a circuit diagram showing a boosted voltage generating/transferring circuit according to the eighth embodiment of the present invention.

FIG. 14 shows a boosted voltage generating/transferring circuit according to the eighth embodiment of the present invention.

The circuit of this embodiment is characterized in that the boosted voltage generating/transferring circuit is constituted by three boost units (represented by ★). A newly added boost unit is formed from an N-channel MOS transistor QN9 and capacitor C6. An inverter circuit I9 is connected between the output terminal of a NAND circuit and the capacitor C6.

[Ninth Embodiment]

Figure 15:
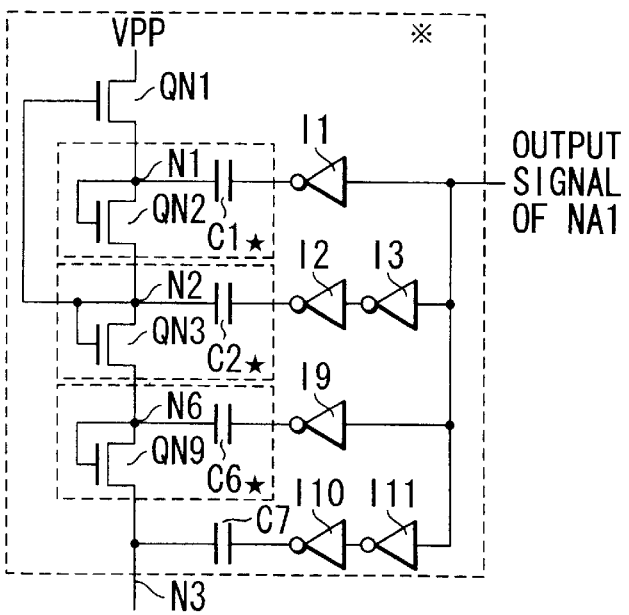
FIG. 15 is a circuit diagram showing a boosted voltage generating/transferring circuit according to the ninth embodiment of the present invention.

FIG. 15 shows a boosted voltage generating/transferring circuit according to the ninth embodiment of the present invention.

In the circuit of this embodiment, the boosted voltage generating/transferring circuit comprises three boost units (represented by ★). A newly added boost unit is formed from an N-channel MOS transistor QN9 and capacitor C6. An inverter circuit I9 is connected between the output terminal of a NAND circuit and the capacitor C6.

In the ninth embodiment, a capacitor C7 and inverter circuits I10 and I11 are series-connected between the output terminal of a NAND circuit and a node N3.

[10th Embodiment]

Figure 16:
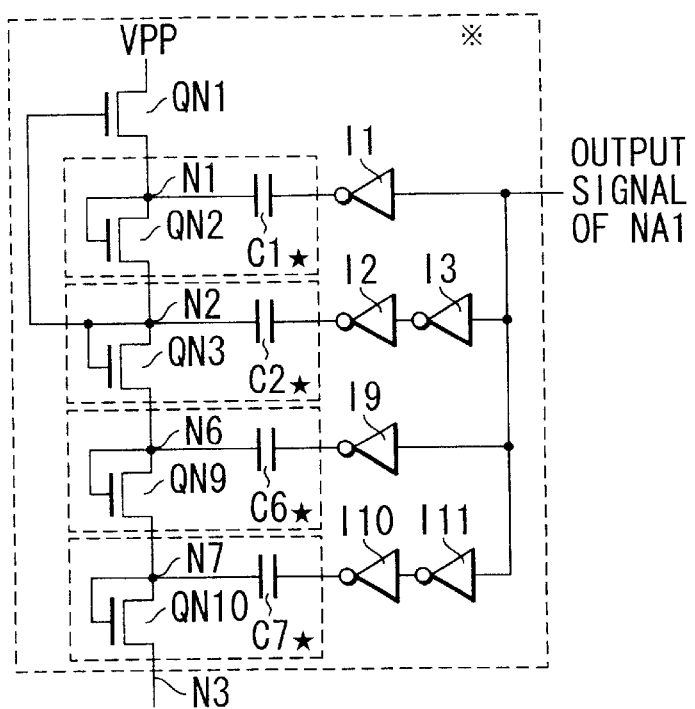
FIG. 16 is a circuit diagram showing a boosted voltage generating/transferring circuit according to the 10th embodiment of the present invention.

FIG. 16 shows a boosted voltage generating/transferring circuit according to the 10th embodiment of the present invention.

In the circuit of this embodiment, the boosted voltage generating/transferring circuit comprises four boost units (represented by ★). Two newly added boost units are respectively formed from N-channel MOS transistors QN9 and QN10 and capacitors C6 and C7. An inverter circuit I9 is connected between the output terminal of a NAND circuit and the capacitor C6, whereas inverter circuits I10 and I11 are connected between the output terminal of the NAND circuit and the capacitor C7.

In the circuits of the seventh to 10th embodiments (FIGS. 13, 14, 15, and 16), the gate of the MOS transistor QN1 is connected to a node (corresponding to the node N2) between the gate and drain of the transistor QN3 in the second boost unit counted from the VPP node.

In this case, similar to the first to sixth embodiments (FIG. 3, 8, 9, 10, 11, and 12), the voltage levels of the gate and source (corresponding to the node N1) of the transistor QN1 gradually rise while changing in opposite phases. In the circuits of the seventh to 10th embodiments, the gate of the transistor QN1 is connected to the input portion (capacitor) of he boost unit. The ultimate voltage of the gate of the transistor QN1 is higher than in the circuits shown in FIGS. 1 and 2.

Since the circuits of the seventh to 10th embodiments also satisfy requirements ① and ② described in the circuit of FIG. 3, they can realize high boosting ability of the boost unit, high transfer capacity for the boosted voltage VPP, and a low power supply voltage in comparison with the circuits of FIGS. 1 and 2.

[11th Embodiment]

Figure 17:
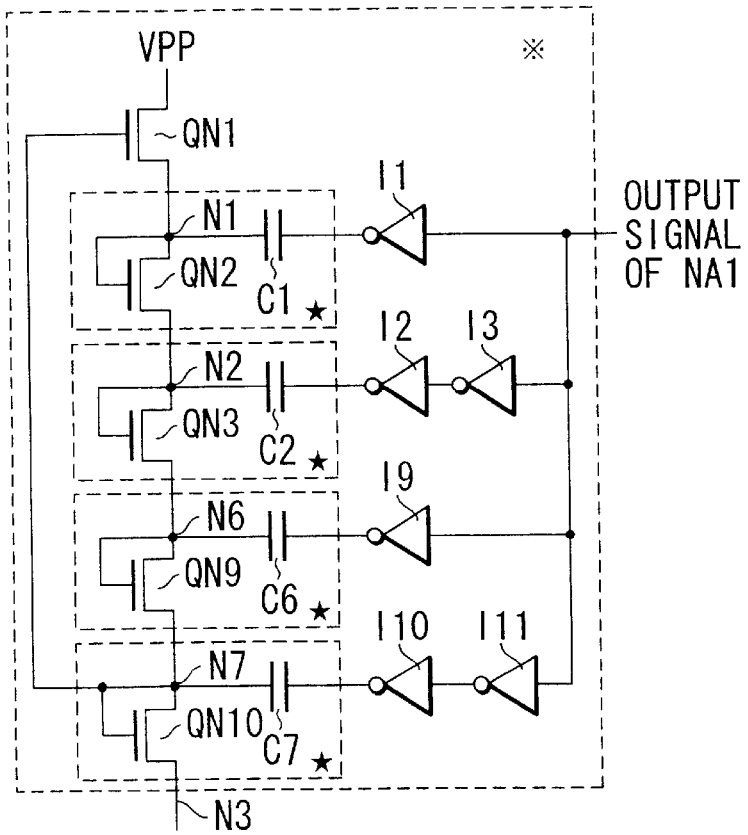
FIG. 17 is a circuit diagram showing a boosted voltage generating/transferring circuit according to the 11th embodiment of the present invention.

FIG. 17 shows a boosted voltage generating/transferring circuit according to the 11th embodiment of the present invention.

The circuit of this embodiment is different from that of the 10th embodiment in that the gate of a transistor QN1 is connected to a node (corresponding to a node N7) between the gate and drain in the fourth boost unit counted from the VPP node.

In this case, the voltage levels of a node N2 and the node N7 are in phase. In the circuit of the 11th embodiment, as well as the circuit of the 10th embodiment, the voltage levels of the gate and source (node N1) of the transistor QN1 are in opposite phases.

In the circuit of this embodiment, the gate of the MOS transistor QN1 is connected to the node N7 exhibiting the highest ultimate voltage, so that its gate voltage can be set to a sufficiently high ultimate voltage.

The circuit of the 11th embodiment also satisfies both requirements ① and ② By described in the circuit of FIG. 3, and can realize high boosting ability of the boost unit, high transfer capacity for the boosted voltage VPP, and a low power supply voltage in comparison with the circuits of FIGS. 1 and 2.

According to the present invention, when the boosted voltage generating/transferring circuit has a plurality of boost units, conditions are satisfied by connecting the gate of the transistor QN1 to an input portion (corresponding to a node between the gate and drain of a transistor and a capacitor) in an even-numbered boost unit counted from the VPP node. The circuit can achieve high boosting ability of the boost unit, high transfer capacity for the boosted voltage VPP, and a low power supply voltage in comparison with the circuits of FIGS. 1 and 2.

A comparison of the boosting ability of the boost unit between the seventh to 11th embodiments (FIGS. 13 to 17) suggests that the 11th embodiment (FIG. 17) attains the highest effect. The boosting ability of the boost unit is higher in order of the seventh embodiment (FIG. 13)→the eighth embodiment (FIG. 14)→the ninth embodiment (FIG. 15)→the 10th embodiment (FIG. 16)→the 11th embodiment (FIG. 17).

A comparison of the circuit area between the seventh to 11th embodiments indicates that the seventh embodiment (FIG. 13) attains the smallest circuit area. The circuit area is smaller in order of the 11th embodiment (FIG. 17)→the 10th embodiment (FIG. 16)→the ninth embodiment (FIG. 15)→the eighth embodiment (FIG. 14)→the seventh embodiment (FIG. 13).

In actually applying the boosted voltage generating/transferring circuit of the present invention to a product (e.g., EEPROM), an optimal circuit is selected from the above-described circuits in consideration of the use conditions of the product and the like.

[12th to 15th Embodiments]

Figure 18:
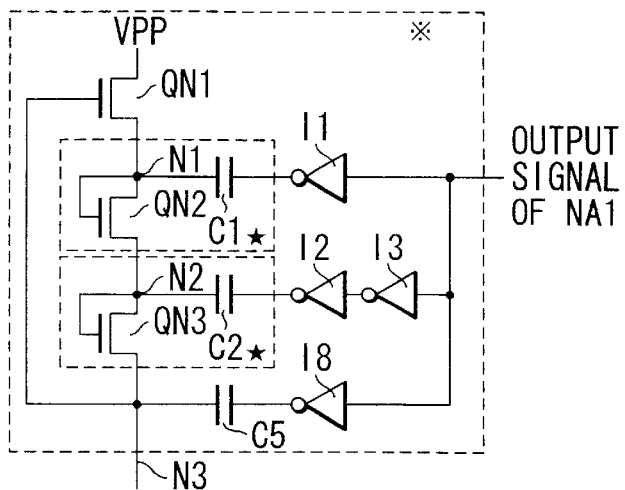
FIG. 18 is a circuit diagram showing a boosted voltage generating/transferring circuit according to the 12th embodiment of the present invention.
Figure 19:
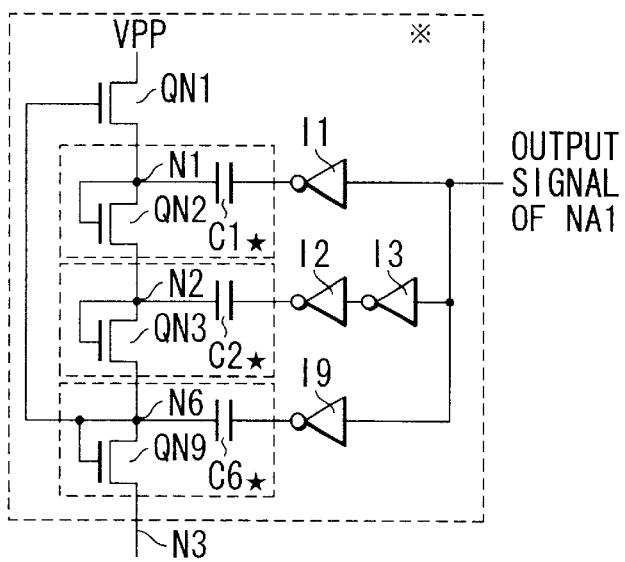
FIG. 19 is a circuit diagram showing a boosted voltage generating/transferring circuit according to the 13th embodiment of the present invention.
Figure 20:
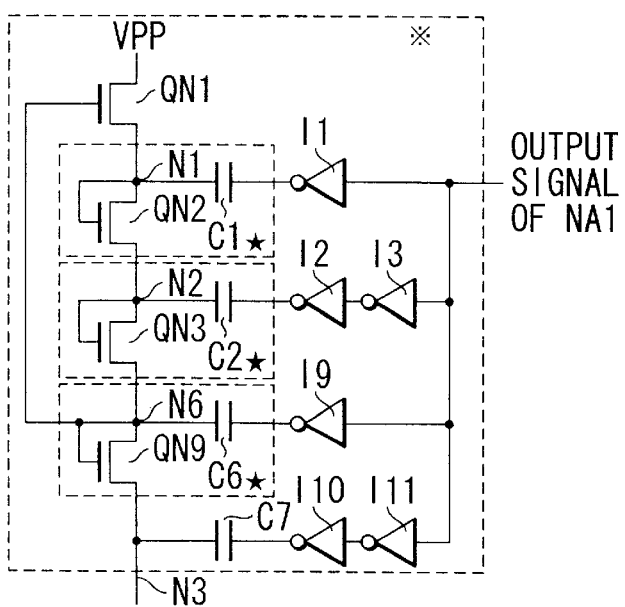
FIG. 20 is a circuit diagram showing a boosted voltage generating/transferring circuit according to the 14th embodiment of the present invention.
Figure 21:
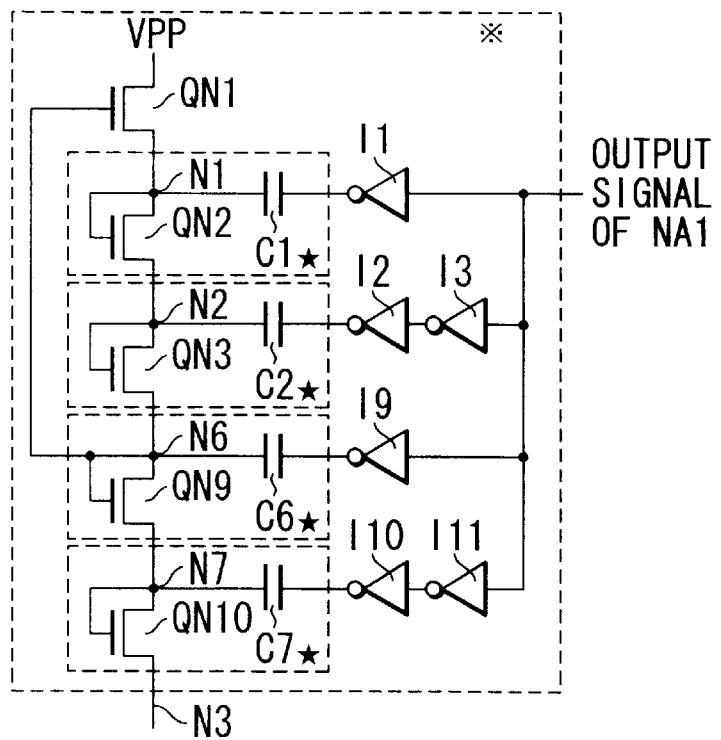
FIG. 21 is a circuit diagram showing a boosted voltage generating/transferring circuit according to the 15th embodiment of the present invention.

FIG. 18 shows a boosted voltage generating/transferring circuit according to the 12th embodiment of the present invention. FIG. 19 shows a boosted voltage generating/transferring circuit according to the 13th embodiment of the present invention. FIG. 20 shows a boosted voltage generating/transferring circuit according to the 14th embodiment of the present invention. FIG. 21 shows a boosted voltage generating/transferring circuit according to the 15th embodiment of the present invention.

The circuit of the 12th embodiment (FIG. 18) corresponds to that of the seventh embodiment (FIG. 13).

In the circuit of the 12th embodiment, the gate of a transistor QN1 is connected to a node N3. For this reason, the gate and source of the transistor QN1 are in phase, which does not satisfy requirement ②. However, also in the circuit of the 12th embodiment, the gate of the transistor QN1 is connected to a capacitor C5, and two boost units are formed. Hence, the ultimate voltage is higher than in the circuits of FIGS. 1 and 2, which satisfies condition ①.

Compared to the circuits of FIGS. 1 and 2, the circuit of the 12th embodiment can attain high boosting ability of the boost unit, high transfer capacity for the boosted voltage VPP, and a low power supply voltage Vcc.

The circuit of the 13th embodiment (FIG. 19) corresponds to that of the eighth embodiment (FIG. 14); the circuit of the 14th embodiment (FIG. 20), to that of the ninth embodiment (FIG. 15); and the circuit of the 15th embodiment (FIG. 21), to that of the 10th embodiment (FIG. 16).

In the circuits of the 13th, 14th, and 15th embodiments, the gate of a transistor QN1 is connected to a node N6. Therefore, the gate and source of the ski transistor QN1 are in phase, which does not satisfy requirement ②. However, also in the circuits of the 13th, 14th, and 15th embodiments, the gate of the transistor QN1 is connected to a capacitor, and three or more boost units are formed. Thus, the ultimate voltage is higher than in the circuits of FIGS. 1 and 2, which satisfies condition ①.

Compared to the circuits of FIGS. 1 and 2, the circuits of the 13th, 14th, and 15th embodiments can obtain high boosting ability of the boost unit, high transfer capacity for the boosted voltage VPP, and a low power supply voltage Vcc.

[16th Embodiment]

Figure 22:
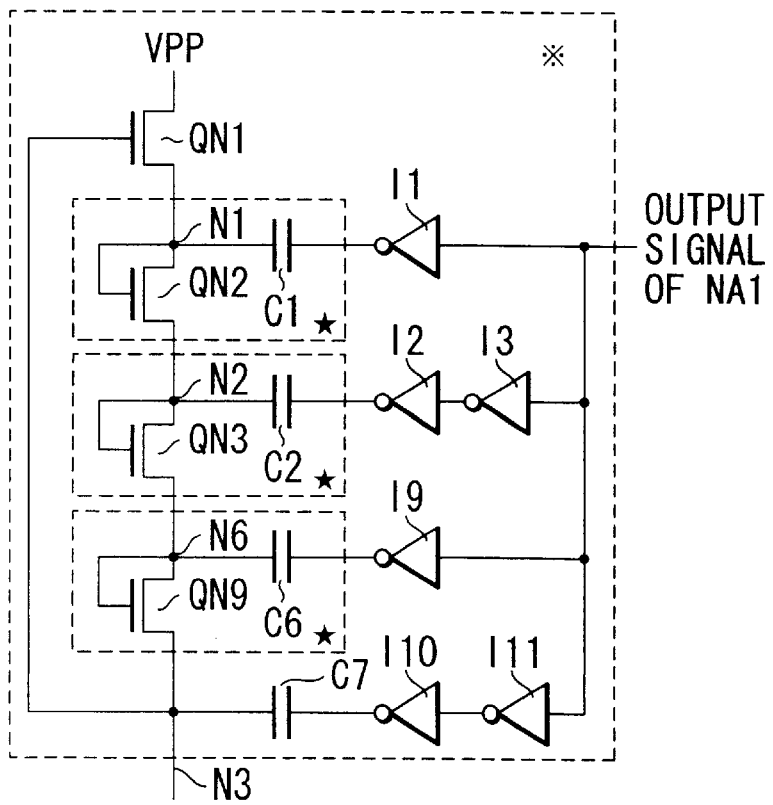
FIG. 22 is a circuit diagram showing a boosted voltage generating/transferring circuit according to the 16th embodiment of the present invention.

FIG. 22 shows a boosted voltage generating/transferring circuit according to the 16th embodiment of the present invention.

The circuit of this embodiment corresponds to that of the eighth embodiment (FIG. 14). The gate of the transistor QN1 is connected to the node N2 in the circuit of the eighth embodiment, while the gate of a transistor QN1 is connected to a node N3 in the circuit of the 16th embodiment.

The voltage levels of a node N2 and the node N3 are in phase, so that the circuit of the 16th embodiment satisfies requirement ②, similar to the circuit of the eighth embodiment. Also, the node N3 is connected to a capacitor C7, three boost units are formed, and the ultimate voltage of the transistor QN1 is high, which satisfies requirement ①.

The circuit of the 16th embodiment can achieve high boosting ability of the boost unit, high transfer capacity for the boosted voltage VPP, and a low power supply voltage Vcc in comparison with the circuits of FIGS. 1 and 2.

[17th Embodiment]

Figure 23:
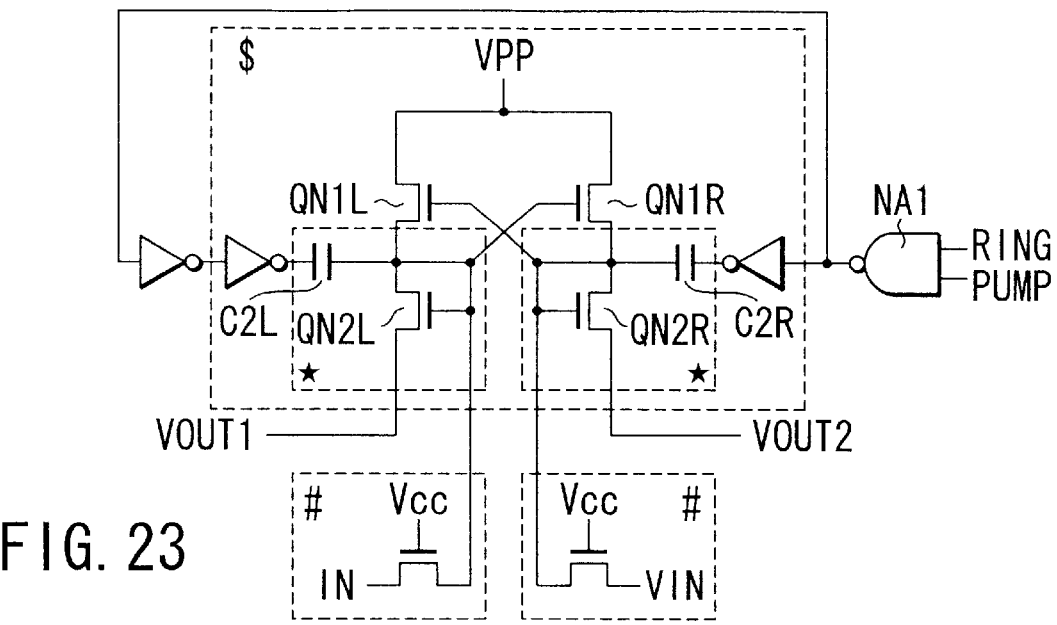
FIG. 23 is a circuit diagram showing a boosted voltage generating/transferring circuit according to the 17th embodiment of the present invention.

FIG. 23 shows a boosted voltage generating/transferring circuit according to the 17th embodiment of the present invention.

The circuit of this embodiment is characterized in that two circuit sections having a boost function (corresponding to, e.g., a section where the transistor QN1 and boost unit are directly connected in the first to 16th embodiments) are parallel-arranged on the right and left sides.

The input portion (node between a capacitor and a transistor) of one boost unit is connected to the gate of a transistor in the other boost unit. As for the two boost units (represented by ★), an oscillation signal input to one boost unit and an oscillation signal input to the other boost unit are in opposite phases.

The gate and source voltage levels of transistors QN1L and QN1R connected to the VPP node gradually rise while changing in opposite phases. The circuit of the 17th embodiment also satisfies condition ②.

The gate of the transistor QN1L is connected to the input portion (node between a capacitor and a transistor) of the right boost unit, and that of the transistor QN1R is connected to the input portion (node between a capacitor and a transistor) of the left boost unit. Accordingly, the maximum voltages of the transistors QN1L and QN1R are higher than output voltages VOUT1 and VOUT2 (based on the same principle in FIGS. 3, 8, 9, and 10).

The circuit of this embodiment satisfies both requirements ① and ②, and thus can achieve high boosting ability of the boost unit, high transfer capacity for the boosted voltage VPP, and a low power supply voltage Vcc, compared to the circuits of FIGS. 1 and 2.

In general, a circuit, like the circuit of FIG. 23, in which two circuit sections having a boost function (corresponding to, e.g., a section where the transistor QN1 and boost unit are directly connected in the first to 16th embodiments) are parallel-arranged on the right and left sides, and the input portion (node between a capacitor and a transistor) of one boost unit is connected to the gate of a transistor in the other boost unit can satisfy condition ② so long as the gates of the transistors QN1L and QN1R are connected to the input portions of odd-numbered boost units counted from the VPP node.

[18th Embodiment]

Figure 24:
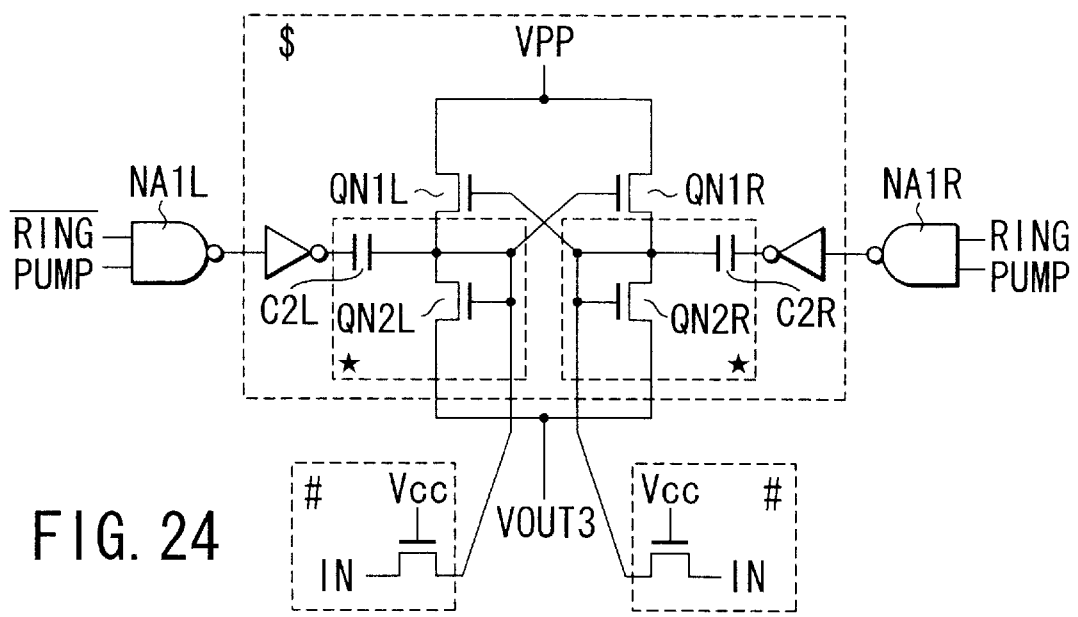
FIG. 24 is a circuit diagram showing a boosted voltage generating/transferring circuit according to the 18th embodiment of the present invention.

FIG. 24 shows a boosted voltage generating/transferring circuit according to the 18th embodiment of the present invention.

The circuit of this embodiment is a modification of the circuit of FIG. 23.

The circuit of the 18th embodiment is characterized in that output portions (sources of transistors in boost units) VOUT1 and VOUT2 of two boost units (represented by ★) in FIG. 23 are connected to each other, and their node serves as an output node VOUT3.

In the circuit of the 18th embodiment, an oscillation signal (corresponding to /RING) input to a left NAND circuit NA1L and an oscillation signal (corresponding to RING) input to a right NAND circuit NA1R are in opposite phases, and oscillation signals input to the two, right and left boost units are also in opposite phases. Consequently, the same function as that of the circuit of FIG. 23 can be realized.

In FIGS. 23 and 24, a circuit at a section (represented by #) surrounded by a dotted line functions to set the gates of the transistors QN1L and QN1R to low level (0V) in the OFF state.

Figure 25:
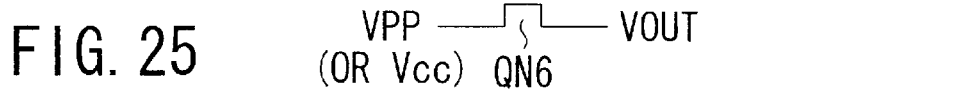
FIG. 25 is a circuit diagram showing a transistor for receiving an output signal from the circuit of FIG. 23 or 24 and transferring a boosted voltage.

The circuits of FIGS. 23 and 24 can use the output voltages VOUT1, VOUT2, and VOUT3 as boosted voltages. As shown in FIG. 25, the output voltages VOUT1, VOUT2, and VOUT3 in the circuits of FIGS. 23 and 24 may be applied to the gate of an N-channel MOS transistor QN6, and the transistor QN6 may be used as a transistor for transferring the boosted voltage VPP.

[19th Embodiment]

FIG. 26 shows a boosted voltage generating/transferring circuit according to the 19th embodiment of the present invention.

The circuit of the 19th embodiment is a modification of the circuit of FIG. 23. The circuit of this embodiment is different from that of FIG. 23 in that transistors QN1L and QN1R are connected not to the VPP node (boosted voltage) but to the Vcc node (power supply voltage). The remaining structure of the circuit of the 19th embodiment is the same as that of the circuit of FIG. 23.

In this structure, output voltages VOUT1 and VOUT2 are boosted voltages of a power supply voltage Vcc. The circuit of this embodiment also satisfies both requirements ① and ②, and can achieve high boosting ability of the boost unit, high transfer capacity for the boosted voltage VPP, and a low power supply voltage Vcc, compared to the circuits of FIGS. 1 and 2.

[20th Embodiment]

FIG. 27 shows a boosted voltage generating/transferring circuit according to the 20th embodiment of the present invention.

The circuit of the 20th embodiment is a modification of the circuit of FIG. 24. The circuit of this embodiment is different from that of FIG. 24 in that transistors QN1L and QN1R are connected not to the VPP node (boosted voltage) but to the Vcc node (power supply voltage). The remaining structure of the circuit of the 20th embodiment is the same as that of the circuit of FIG. 24.

In this structure, an output voltage VOUT3 is a boosted voltage of a power supply voltage Vcc. Since the circuit of this embodiment also satisfies both requirements ① and ②, it can achieve high boosting ability of the boost unit, high transfer capacity for the boosted voltage VPP, and a low power supply voltage Vcc, compared to the circuits of FIGS. 1 and 2.

In FIGS. 26 and 27, a circuit at a section (represented by #) surrounded by a dotted line functions to set the gates of the transistors QN1L and QN1R to low level (0V) in the OFF state.

The circuits of FIGS. 26 and 27 can use the output voltages VOUT1, VOUT2, and VOUT3 as boosted voltages.

As shown in FIG. 28, the output voltages VOUT1, VOUT2, and VOUT3 in the circuits of FIGS. 26 and 27 may be applied to the gate of an N-channel MOS transistor QN6, and the transistor QN6 may be used as a transistor for transferring the boosted voltage VPP.

[21st Embodiment]

Figure 29:
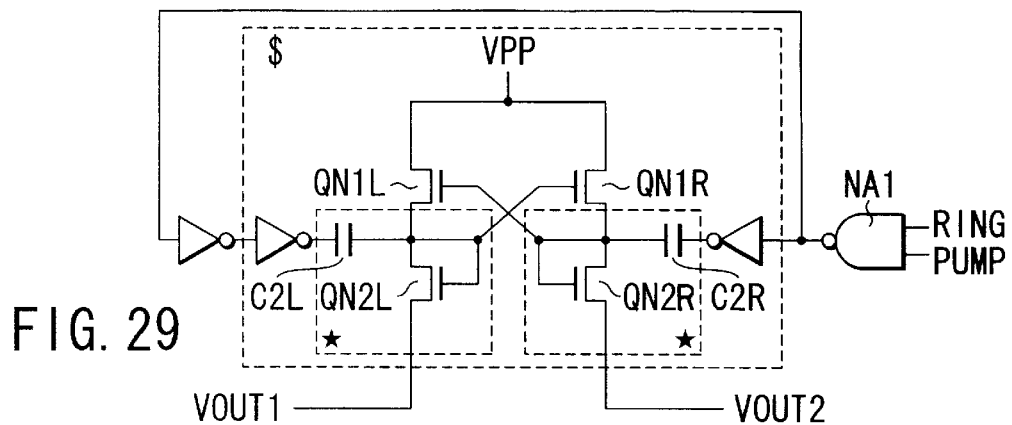
FIG. 29 is a circuit diagram showing a boosted voltage generating/transferring circuit according to the 21st embodiment of the present invention.

FIG. 29 shows a boosted voltage generating/transferring circuit according to the 21st embodiment of the present invention.

The circuit of the 21st embodiment is a modification of the circuit of FIG. 23. The circuit of this embodiment is different from that of FIG. 23 in that a circuit for setting the gates of transistors QN1L and QN1R to low level in the OFF state, i.e., the section (represented by #) surrounded by the dotted line in the circuit of FIG. 23 is absent. The remaining structure of the circuit of the 21st embodiment is the same as that of the circuit of FIG. 23.

Also in this case, the circuit of this embodiment satisfies both requirements ① and ②, and thus can achieve high boosting ability of the boost unit, high transfer capacity for the boosted voltage VPP, and a low power supply voltage Vcc, compared to the circuits of FIGS. 1 and 2. This circuit is effective when the leakage current is not large.

[22nd Embodiment]

Figure 30:
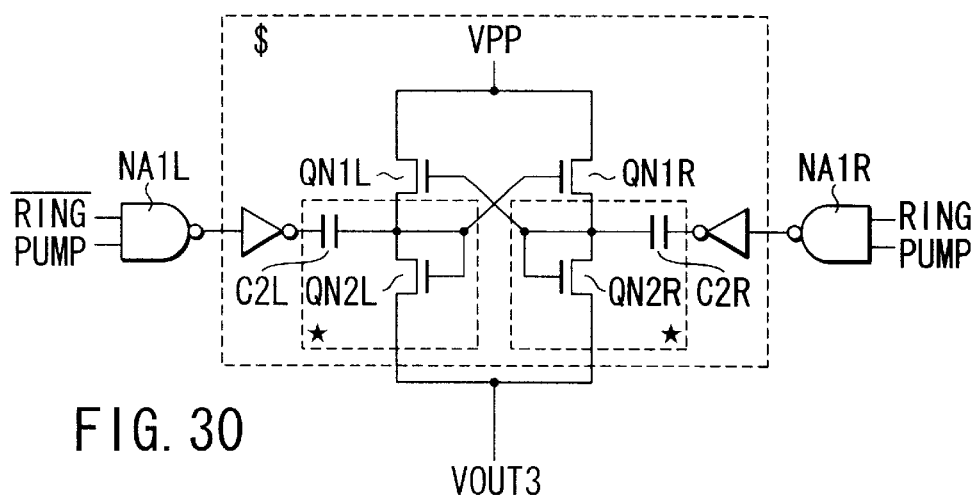
FIG. 30 is a circuit diagram showing a boosted voltage generating/transferring circuit according to the 22nd embodiment of the present invention.

FIG. 30 shows a boosted voltage generating/transferring circuit according to the 22nd embodiment of the present invention.

The circuit of the 22nd embodiment is a modification of the circuit of FIG. 24. The circuit of this embodiment is different from that of FIG. 24 in that a circuit for setting the gates of transistors QN1L and QN1R to low level in the OFF state, i.e., the section (represented by #) surrounded by the dotted line in the circuit of FIG. 24 is absent. The remaining structure of the circuit of the 22nd embodiment is the same as that of the circuit of FIG. 24.

Also in this case, the circuit of this embodiment satisfies both requirements ① and ②, so that it can achieve high boosting ability of the boost unit, high transfer capacity for the boosted voltage VPP, and a low power supply voltage Vcc, compared to the circuits of FIGS. 1 and 2. This circuit is effective when the leakage current is not large.

Figure 31:
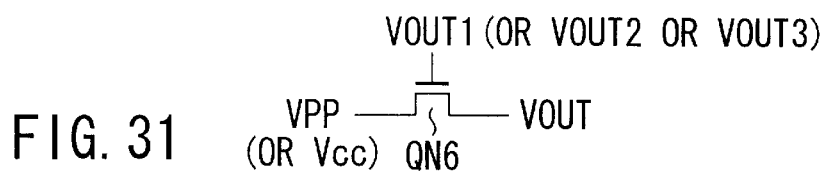
FIG. 31 is a circuit diagram showing a transistor for receiving an output signal from the circuit of FIG. 29 or 30 and transferring a boosted voltage.

The circuits of FIGS. 29 and 30 can use the output voltages VOUT1, VOUT2, and VOUT3 as boosted voltages. As shown in FIG. 31, the output voltages VOUT1, VOUT2, and VOUT3 in the circuits of FIGS. 29 and 30 may be applied to the gate of an N-channel MOS transistor QN6, and the transistor QN6 may be used as a transistor for transferring the boosted voltage VPP.

[23rd Embodiment]

Figure 32:
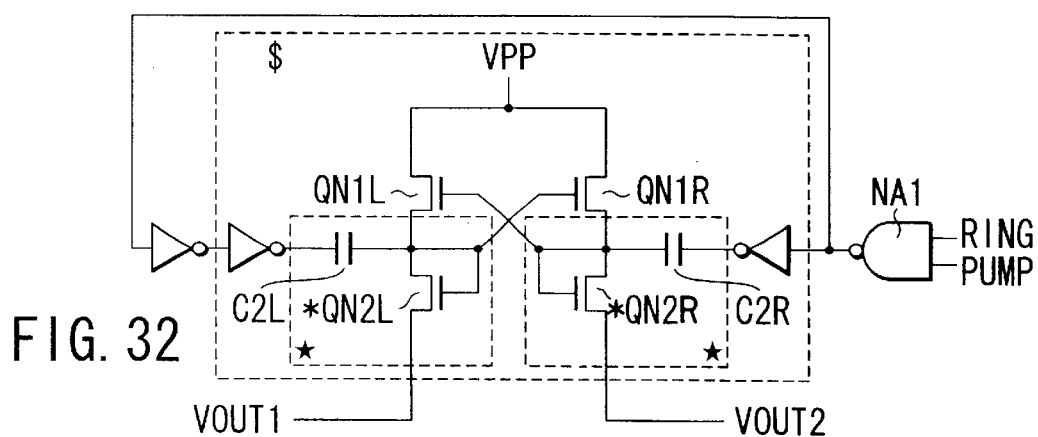
FIG. 32 is a circuit diagram showing a boosted voltage generating/transferring circuit according to the 23rd embodiment of the present invention.

FIG. 32 shows a boosted voltage generating/transferring circuit according to the 23rd embodiment of the present invention.

The circuit of the 23rd embodiment is a modification of the circuit of FIG. 29. The circuit of this embodiment is different from that of FIG. 29 in that a threshold voltage *Vtn of transistors *QN2L and *QN2R in boost units (represented by ★) is set lower than a threshold voltage Vtn of transistors QN1L and QN1R connected to the VPP node (* represents a transistor whose threshold voltage is low). The remaining structure of the circuit of the 23rd embodiment is the same as that of the circuit of FIG. 29.

Also in this case, the circuit of this embodiment satisfies both requirements ① and ②, so that it can achieve high boosting ability of the boost unit, high transfer capacity for the boosted voltage VPP, and a low power supply voltage Vcc, compared to the circuits of FIGS. 1 and 2. In addition, the circuit of this embodiment can lower the threshold voltage of the transistor *QN2L, *QN2R, which contributes to increasing the boosting ability of the boost unit.

[24th Embodiment]

Figure 33:
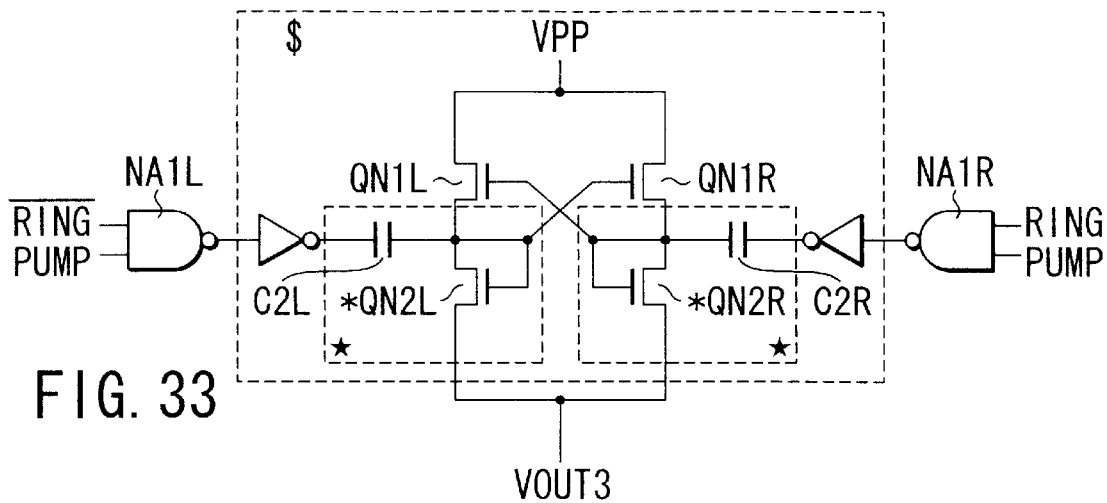
FIG. 33 is a circuit diagram showing a boosted voltage generating/transferring circuit according to the 24th embodiment of the present invention.

FIG. 33 shows a boosted voltage generating/transferring circuit according to the 24th embodiment of the present invention.

The circuit of the 24th embodiment is a modification of the circuit of FIG. 30. The circuit of this embodiment is different from that of FIG. 30 in that a threshold voltage *Vtn of transistors *QN2L and *QN2R in boost units (represented by ★) is set lower than a threshold voltage Vtn of transistors QN1L and QN1R connected to the VPP node (* represents a transistor whose threshold voltage is low). The remaining structure of the circuit of the 24th embodiment is the same as that of the circuit of FIG. 30.

Also in this case, the circuit of this embodiment satisfies both requirements ① and ②, so that it can achieve high boosting ability of the boost unit, high transfer capacity for the boosted voltage VPP, and a low power supply voltage Vcc, compared to the circuits of FIGS. 1 and 2. In addition, the circuit of this embodiment can lower the threshold voltage of the transistor *QN2L, *QN"R, which contributes to increasing the boosting ability of the boost unit.

Figure 34:
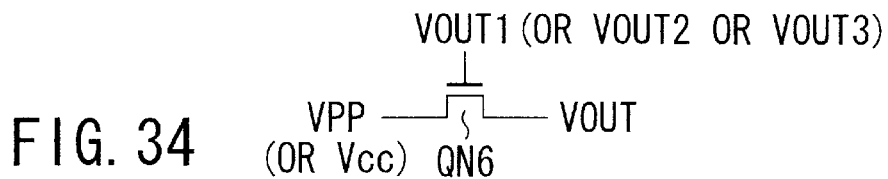
FIG. 34 is a circuit diagram showing a transistor for receiving an output signal from the circuit of FIG. 32 or 33 and transferring a boosted voltage.

The circuits of FIGS. 32 and 33 can use the output voltages VOUT1, VOUT2, and VOUT3 as boosted voltages. As shown in FIG. 34, the output voltages VOUT1, VOUT2, and VOUT3 in the circuits of FIGS. 32 and 33 may be applied to the gate of an N-channel MOS transistor QN6, and the transistor QN6 may be used as a transistor for transferring the boosted voltage VPP.

Modifications of the sections (represented by $) surrounded by the dotted lines in the 17th to 24th embodiments (FIGS. 23, 24, 26, 27, 29, 30, 32, and 33) will be explained.

[25th Embodiment]

Figure 35:
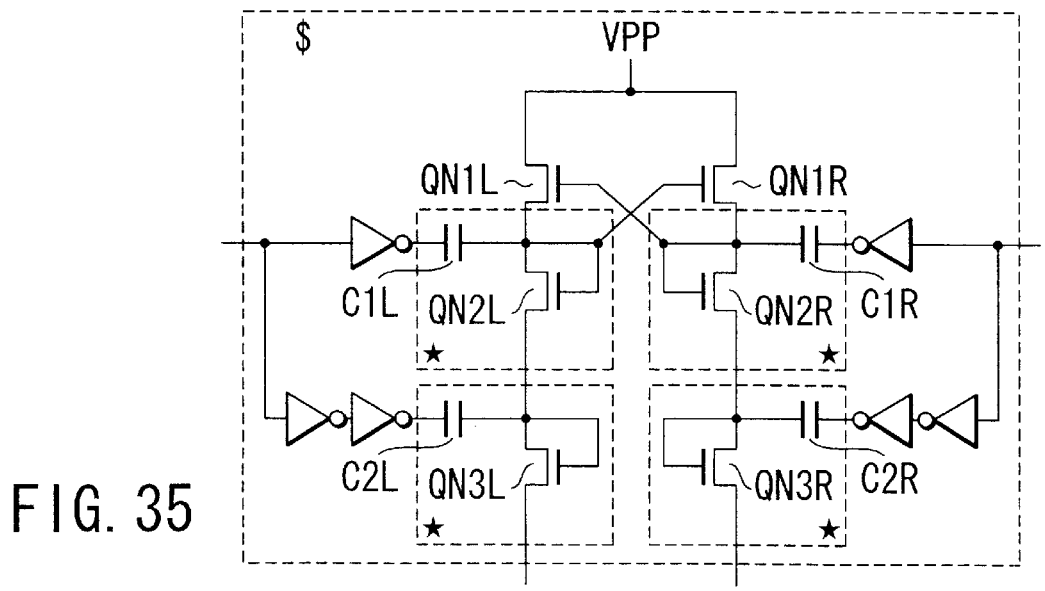
FIG. 35 is a circuit diagram showing a boosted voltage generating/transferring circuit according to the 25th embodiment of the present invention.

FIG. 35 shows a boosted voltage generating/transferring circuit according to the 25th embodiment of the present invention.

The circuit of this embodiment is characterized in that circuit sections having a boost function (corresponding to, e.g., a section where the transistor QN1 and boost unit are directly connected in the first to 16th embodiments) are parallel-arranged on the right and left sides, and that two boost units are arranged on each of the right and left sides.

In the circuit of the 25th embodiment, the gate of a left transistor QN1L connected to the VPP node is connected to the input portion (node between a capacitor and a transistor) of the first boost unit counted from the VPP node of two right boost units. The gate of a right transistor QN1R connected to the VPP node is connected to the input portion of the first boost unit counted from the VPP node of two left boost units.

The gate and source voltage levels of the two transistors QN1L and QN1R connected to the VPP node change in opposite phases and gradually rise, which satisfies condition ②. Since the gates of the transistors QN1L and QN1R are connected to the input portions of the boost units, the maximum gate voltages of the transistors QN1L and QN1R become higher than the output voltages VOUT1, VOUT2, and VOUT3.

Since the circuit of this embodiment also satisfies both conditions ① and ②, it can achieve high boosting ability of the boost unit, high transfer capacity for the boosted voltage VPP, and a low power supply voltage Vcc, compared to the circuits of FIGS. 1 and 2.

[26th Embodiment]

Figure 36:
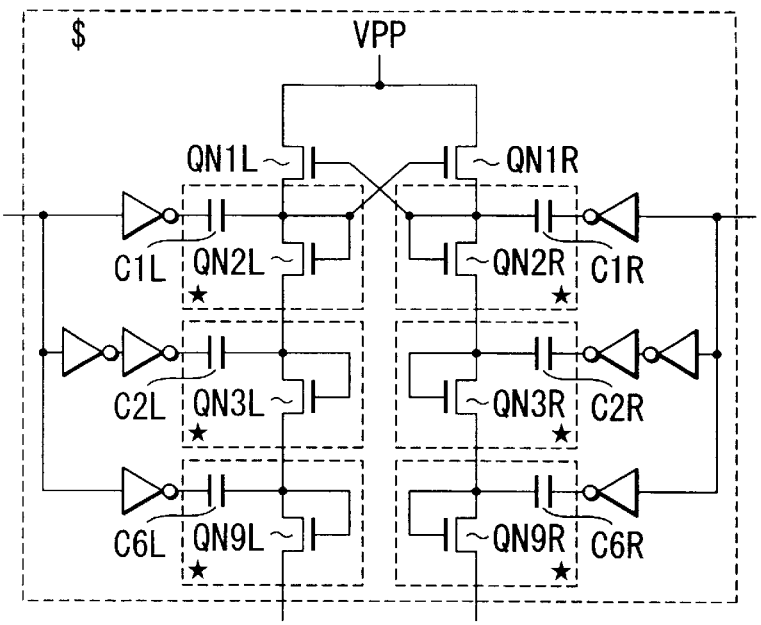
FIG. 36 is a circuit diagram showing a boosted voltage generating/transferring circuit according to the 26th embodiment of the present invention.

FIG. 36 shows a boosted voltage generating/transferring circuit according to the 26th embodiment of the present invention.

The circuit of this embodiment is characterized in that circuit sections having a boost function are parallel-arranged on the right and left sides, and that three boost units are arranged on each of the right and left sides. In the circuit of the 26th embodiment, the gate of a left transistor QN1L is connected to the input portion (node between a capacitor and a transistor) of the first boost unit counted from the VPP node among three right boost units. The gate of a right transistor QN1R is connected to the input portion of the first boost unit counted from the VPP node among three left boost units.

The gate and source voltage levels of the transistors QN1L and QN1R gradually rise while changing in opposite phases, which satisfies condition ②. Since the gates of the transistors QN1L and QN1R are connected to the input portions of the boost units, the maximum gate voltages of the transistors QN1L and QN1R become higher than the output voltages VOUT1, VOUT2, and VOUT3.

Since the circuit of this embodiment also satisfies both conditions ① and ②, it can achieve high boosting ability of the boost unit, high transfer capacity for the boosted voltage VPP, and a low power supply voltage Vcc, compared to the circuits of FIGS. 1 and 2.

[27th Embodiment]

Figure 37:
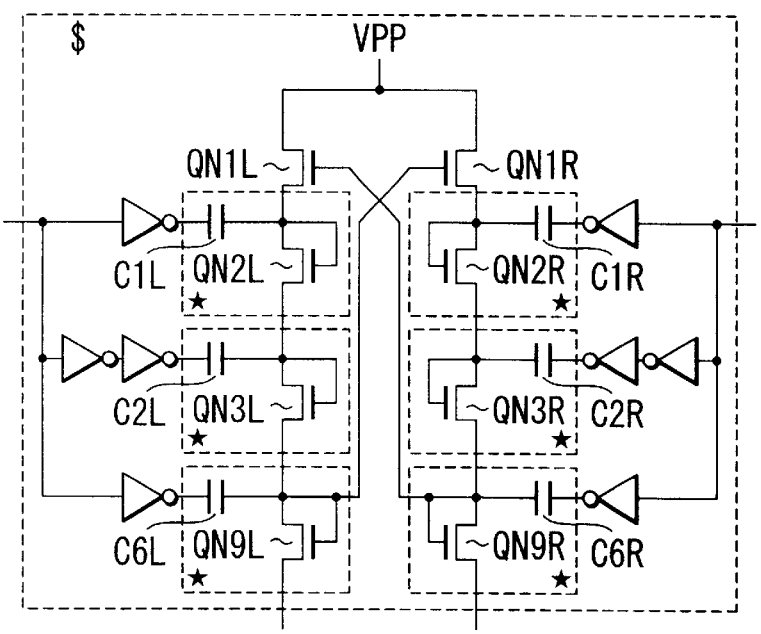
FIG. 37 is a circuit diagram showing a boosted voltage generating/transferring circuit according to the 27th embodiment of the present invention.

FIG. 37 shows a boosted voltage generating/transferring circuit according to the 27th embodiment of the present invention.

The circuit of the 27th embodiment is a modification of the circuit of FIG. 36. The circuit of this embodiment is different from that of FIG. 36 in that the gate of a left transistor QN1L is connected to the input portion of the third boost unit counted from the VPP node among three right boost units, and that of a right transistor QN1R is connected to the input portion of the third boost unit counted from the VPP node among three left boost units.

Also in this structure, the gate and source voltage levels of the transistors QN1L and QN1R gradually rise while changing in opposite phases, which satisfies condition ②. Since the gates of the transistors QN1L and QN1R are connected to the input portions of the boost units, the maximum gate voltages of the transistors QN1L and QN1R become higher than the output voltages VOUT1, VOUT2, and VOUT3.

Since the circuit of this embodiment also satisfies both conditions ① and ②, it can achieve high boosting ability of the boost unit, high transfer capacity for the boosted voltage VPP, and a low power supply voltage Vcc, compared to the circuits of FIGS. 1 and 2.

[28th Embodiment]

Figure 38:
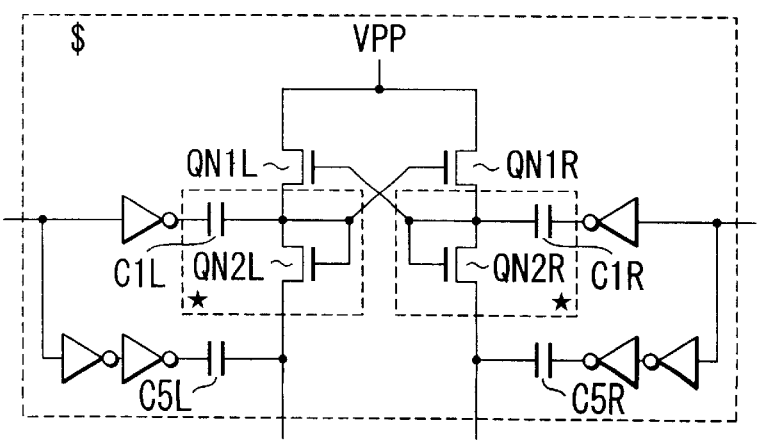
FIG. 38 is a circuit diagram showing a boosted voltage generating/transferring circuit according to the 28th embodiment of the present invention.

FIG. 38 shows a boosted voltage generating/transferring circuit according to the 28th embodiment of the present invention.

The circuit of this embodiment is characterized in that circuit sections having a boosting ability are arranged on the right and left sides, and that one boost unit and one capacitor are arranged on each of the right and left sides.

In the circuit of the 28th embodiment, the gate of a left transistor QN1L is connected to the input portion (node between a capacitor and a transistor) of the right boost unit, and that of a right transistor QN1R is connected to the input portion of the left boost unit.

The gate and source voltage levels of the transistors QN1L and QN1R gradually rise while changing in opposite phases, which satisfies condition ②. Since the gates of the transistors QN1L and QN1R are connected to the input portions of the boost units, the maximum gate voltages of the transistors QN1L and QN1R become higher than the output voltages VOUT1, VOUT2, and VOUT3.

Since the circuit of this embodiment also satisfies both conditions ① and ②, it can achieve high boosting ability of the boost unit, high transfer capacity for the boosted voltage VPP, and a low power supply voltage Vcc, compared to the circuits of FIGS. 1 and 2.

[29th Embodiment]

Figure 39:
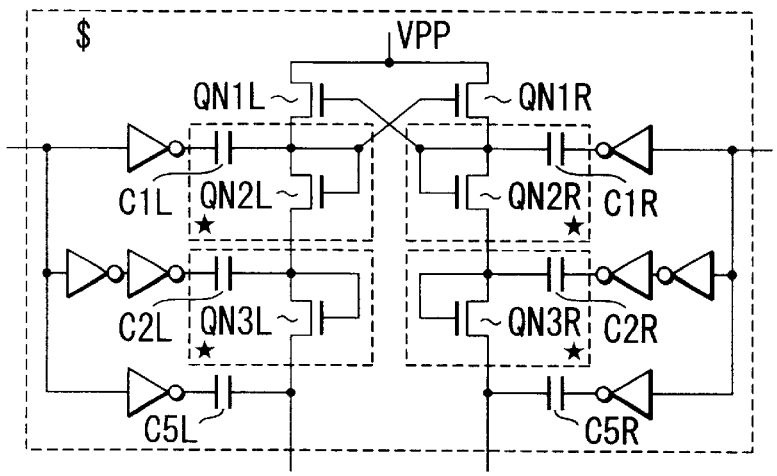
FIG. 39 is a circuit diagram showing a boosted voltage generating/transferring circuit according to the 29th embodiment of the present invention.

FIG. 39 shows a boosted voltage generating/transferring circuit according to the 29th embodiment of the present invention.

The circuit of the 29th embodiment is a modification of the circuit of FIG. 38. The circuit of this embodiment is different from that of FIG. 38 in that two boost units (represented by ★) are arranged on each of the right and left sides.

The remaining structure of the circuit of this embodiment is the same as that of the circuit of FIG. 38. That is, the gate of a left transistor QN1L is connected to the input portion of the first boost unit counted from the VPP node among two right boost units. The gate of a right transistor QN1R is connected to the input portion of the first boost unit counted from the VPP node among two left boost units.

Also in this structure, the gate and source voltage levels of the transistors QN1L and QN1R gradually rise while changing in opposite phases, which satisfies condition ②. Since the gates of the transistors QN1L and QN1R are connected to the input portions of the boost units, the maximum gate voltages of the transistors QN1L and QN1R become higher than the output voltages VOUT1, VOUT2, and VOUT3.

Since the circuit of this embodiment also satisfies both conditions ① and ②, it can achieve high boosting ability of the boost unit, high transfer capacity for the boosted voltage VPP, and a low power supply voltage Vcc, compared to the circuits of FIGS. 1 and 2.

[30th Embodiment]

Figure 40:
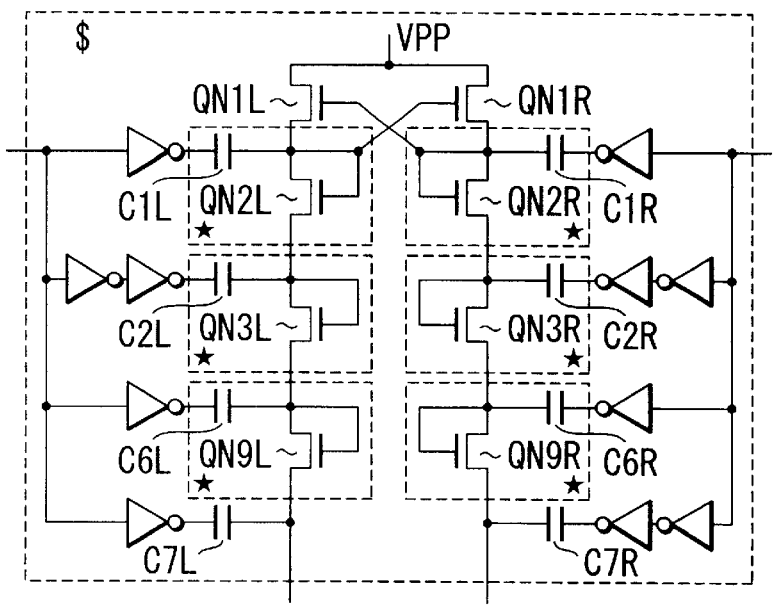
FIG. 40 is a circuit diagram showing a boosted voltage generating/transferring circuit according to the 30th embodiment of the present invention.

FIG. 40 shows a boosted voltage generating/transferring circuit according to the 30th embodiment of the present invention.

The circuit of the 30th embodiment is a modification of the circuit of FIG. 38. The circuit of this embodiment is different from that of FIG. 38 in that three boost units (represented by ★) are arranged on each of the right and left sides.

The remaining structure of the circuit of this embodiment is the same as that of the circuit of FIG. 38. That is, the gate of a left transistor QN1L is connected to the input portion of the first boost unit counted from the VPP node among three right boost units. The gate of a right transistor QN1R is connected to the input portion of the first boost unit counted from the VPP node among three left boost units.

Also in this structure, the gate and source voltage levels of the transistors QN1L and QN1R gradually rise while changing in opposite phases, which satisfies condition ②. Since the gates of the transistors QN1L and QN1R are connected to the input portions of the boost units, the maximum gate voltages of the transistors QN1L and QN1R become higher than the output voltages VOUT1, VOUT2, and VOUT3. Since the circuit of this embodiment also satisfies both conditions ① and ②, it can achieve high boosting ability of the boost unit, high transfer capacity for the boosted voltage VPP, and a low power supply voltage Vcc, compared to the circuits of FIGS. 1 and 2.

[31st Embodiment]

Figure 41:
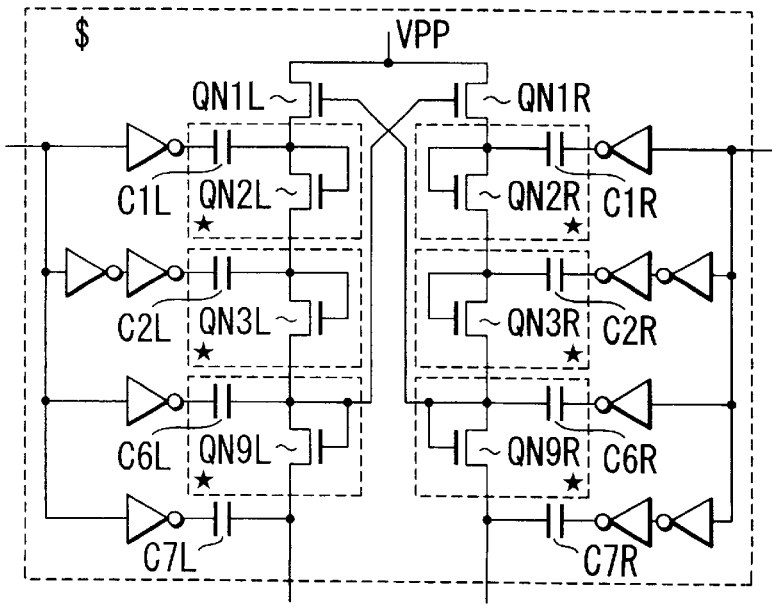
FIG. 41 is a circuit diagram showing a boosted voltage generating/transferring circuit according to the 31st embodiment of the present invention.

FIG. 41 shows a boosted voltage generating/transferring circuit according to the 31st embodiment of the present invention.

The circuit of the 31st embodiment is a modification of the circuit of FIG. 40. The circuit of this embodiment is different from that of FIG. 40 in that the gate of a left transistor QN1L is connected to the input portion of the third boost unit counted from the VPP node among three right boost units, and that of a right transistor QN1R is connected to the input portion of the third boost unit counted from the VPP node among three left boost units.

Also in this structure, the gate and source voltage levels of the transistors QN1L and QN1R gradually rise while changing in opposite phases, which satisfies condition ②. Since the gates of the transistors QN1L and QN1R are connected to the input portions of the boost units, the maximum gate voltages of the transistors QN1L and QN1R become higher than the output voltages VOUT1, VOUT2, and VOUT3.

Since the circuit of this embodiment also satisfies both conditions ①and ②, it can achieve high boosting ability of the boost unit, high transfer capacity for the boosted voltage VPP, and a low power supply voltage vcc, compared to the circuits of FIGS. 1 and 2.

In all the circuits of FIGS. 35 to 41, the gate of the left transistor QN1L is connected to the input portion of an odd-numbered right boost unit counted from the VPP node, and that of the right transistor QN1R is connected to the input portion of an odd-numbered left boost unit counted from the VPP node.

Hence, the gate and source voltage levels of the transistors QN1L and QN1R whose drains are connected to the VPP node gradually rise while changing in opposite phases, which satisfies condition ②. Since the gates of the transistors QN1L and QN1R are connected to the input portions of the boost units, the maximum gate voltages of the transistors QN1L and QN1R become higher than the output voltages VOUT1, VOUT2, and VOUT3.

This can achieve high boosting ability of the boost unit, high transfer capacity for the boosted voltage VPP, and a low power supply voltage Vcc.

When the gate of the left transistor QN1L is connected to the input portion of an even-numbered right boost unit counted from the VPP node, and that of the right transistor QN1R is connected to the input portion of an even-numbered left boost unit counted from the VPP node, the gate and source voltage levels of the transistors QN1L and QN1R change in phase, which does not satisfy condition ②.

However, the gates of the transistors QN1L and QN1R are connected to the input portions of the boost units, so that the maximum gate voltages of the transistors QN1L and QN1R are high. Also in this case, therefore, the circuit can achieve high boosting ability of the boost unit, high transfer capacity for the boosted voltage VPP, and a low power supply voltage Vcc, compared to the circuits of FIGS. 1 and 2.

[32nd Embodiment]

Figure 42:
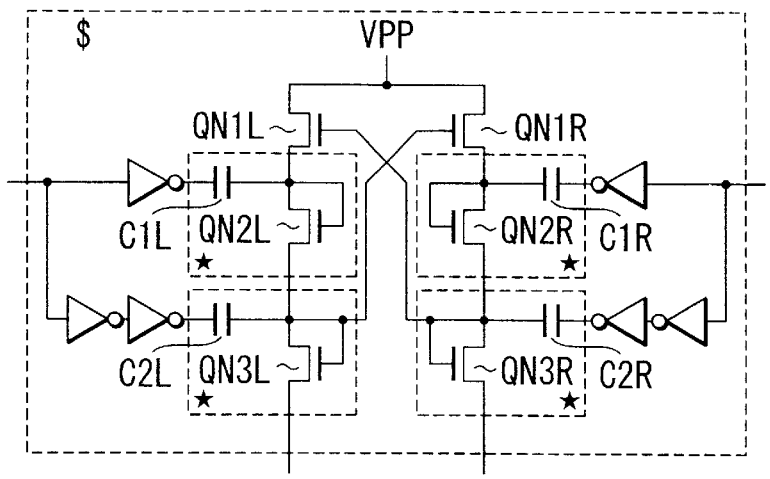
FIG. 42 is a circuit diagram showing a boosted voltage generating/transferring circuit according to the 32nd embodiment of the present invention.

FIG. 42 shows a boosted voltage generating/transferring circuit according to the 32nd embodiment of the present invention.

In the circuit of this embodiment, the gate of a left transistor QN1L is connected to the input portion of the second boost unit counted from the VPP node of two right boost units, and that of a right transistor QN1R is connected to the input portion of the second boost unit counted from the VPP node of two left boost units.

In this case, the gate and source voltage levels of the transistors QN1L and QN1R gradually rise while changing in phase, which does not satisfy condition ②. However, the gates of the transistors QN1L and QN1R are connected to the input portions of the boost units, so that the maximum gate voltages of the transistors QN1L and QN1R become higher than the output voltages VOUT1, VOUT2, and VOUT3.

Since the circuit of this embodiment also satisfies both conditions ①and ②1 , it can achieve high boosting ability of the boost unit, high transfer capacity for the boosted voltage VPP, and a low power supply voltage Vcc, compared to the circuits of FIGS. 1 and 2.

[33rd to 35th Embodiments]

Figure 43:
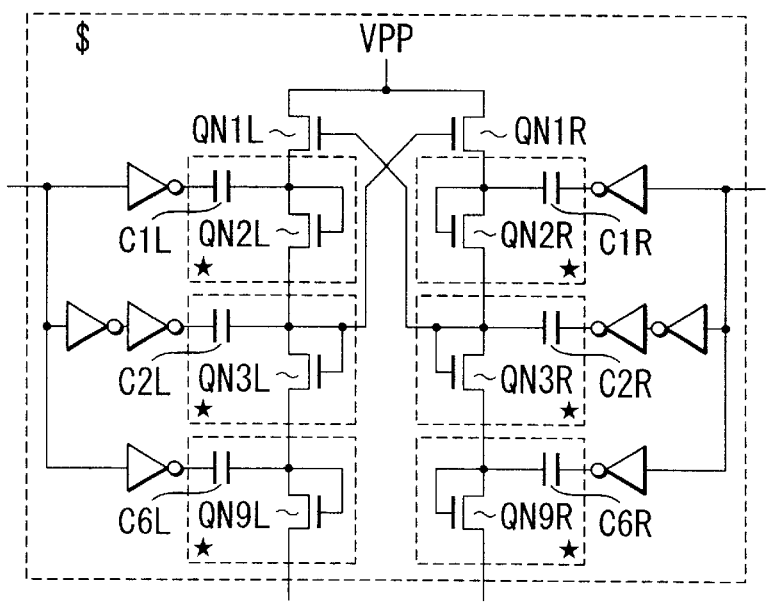
FIG. 43 is a circuit diagram showing a boosted voltage generating/transferring circuit according to the 33rd embodiment of the present invention.
Figure 44:
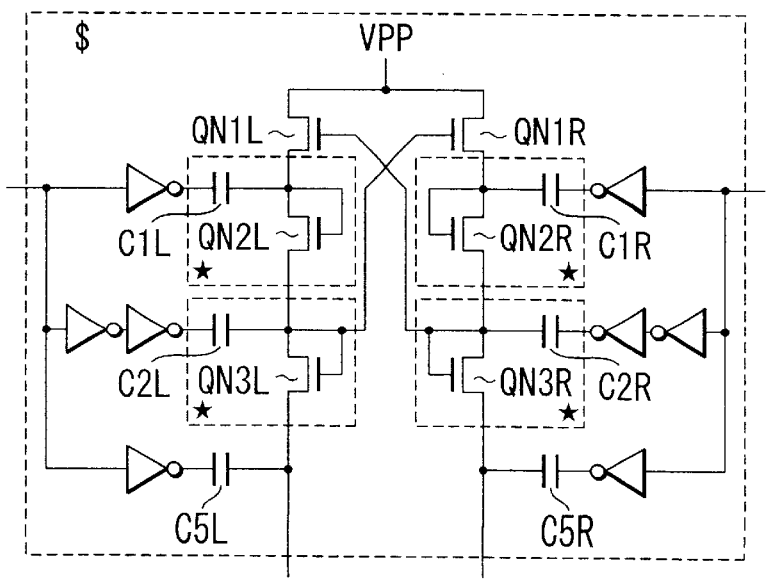
FIG. 44 is a circuit diagram showing a boosted voltage generating/transferring circuit according to the 34th embodiment of the present invention.
Figure 45:
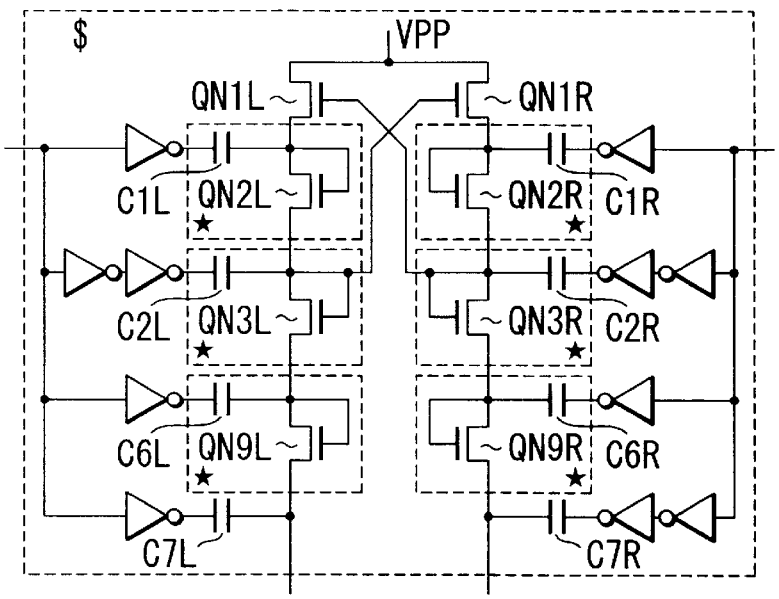
FIG. 45 is a circuit diagram showing a boosted voltage generating/transferring circuit according to the 35th embodiment of the present invention.

FIG. 43 shows a boosted voltage generating/transferring circuit according to the 33rd embodiment of the present invention, FIG. 44 shows a boosted voltage generating/transferring circuit according to the 34th embodiment of the present invention, and FIG. 45 shows a boosted voltage generating/transferring circuit according to the 35th embodiment of the present invention.

Also in these circuits, the gate of a left transistor QN1L is connected to the input portion of an even-numbered boost unit counted from the VPP node among a plurality of right boost units, and that of a right transistor QN1R is connected to the input portion of an even-numbered boost unit counted from the VPP node among a plurality of left boost units.

That is, the gate and source voltage levels of the transistors QN1L and QN1R gradually rise while changing in phase, which does not satisfy condition ②. However, the gates of the transistors QN1L and QN1R are connected to the input portions of the boost units, so that the maximum gate voltages of the transistors QN1L and QN1R become higher than the output voltages VOUT1, VOUT2, and VOUT3.

These circuits can also achieve high boosting ability of the boost unit, high the transfer capacity for the boosted voltage VPP, and a low the power supply voltage Vcc, compared to the circuits of FIGS. 1 and 2.

[36th and 37th Embodiments]

Figure 46:
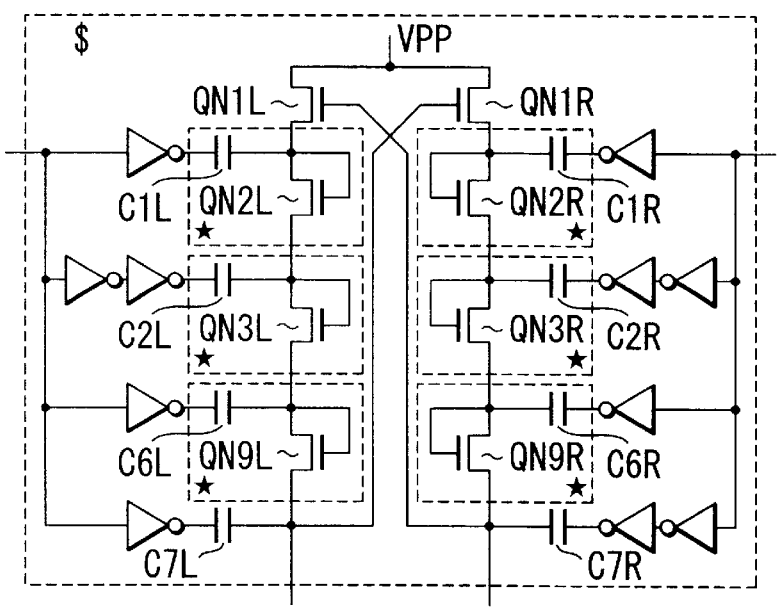
FIG. 46 is a circuit diagram showing a boosted voltage generating/transferring circuit according to the 36th embodiment of the present invention.
Figure 47:
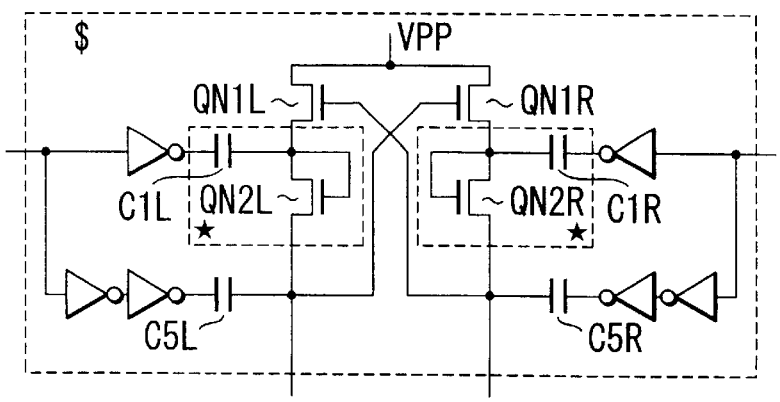
FIG. 47 is a circuit diagram showing a boosted voltage generating/transferring circuit according to the 37th embodiment of the present invention.

FIG. 46 shows a boosted voltage generating/transferring circuit according to the 36th embodiment of the present invention, and FIG. 47 shows a boosted voltage generating/transferring circuit according to the 37th embodiment of the present invention.

In these circuits, an odd number of boost units are arranged on each of the right and left sides. The gate of a left transistor QN1L is connected to the output portion of an odd-numbered boost unit counted from the VPP node among a plurality of right boost units, and that of a right transistor QN1R is connected to the output portion of an odd-numbered boost unit counted from the VPP node among a plurality of left boost units.

The gate and source voltage levels of the transistors QN1L and QN1R gradually rise while changing in phase, which does not satisfy condition ②. Even so, these circuits can also achieve high boosting ability of the boost unit, high transfer capacity for the boosted voltage VPP, and a low power supply voltage Vcc, compared to the circuits of FIGS. 1 and 2.

[38th Embodiment]

Figure 48:
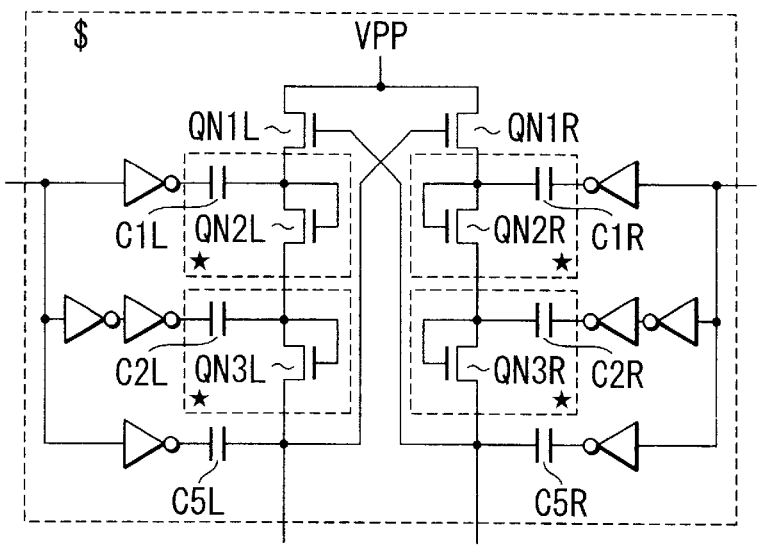
FIG. 48 is a circuit diagram showing a boosted voltage generating/transferring circuit according to the 38th embodiment of the present invention.

FIG. 48 shows a boosted voltage generating/transferring circuit according to the 38th embodiment of the present invention.

In the circuit of this embodiment, an even number of boost units are arranged on each of the right and left sides. The gate of a left transistor QN1L is connected to the output portion of an even-numbered boost unit counted from the VPP node among a plurality of right boost units, and that of a right transistor QN1R is connected to the output portion of an even-numbered boost unit counted from the VPP node among a plurality of left boost units.

The gate and source voltage levels of the transistors QN1L and QN1R gradually rise while changing in opposite phases, which satisfies condition ②. Therefore, this circuit can also achieve high boosting ability of the boost unit, high transfer capacity for the boosted voltage VPP, and a low power supply voltage Vcc.

[39th and 40th Embodiments]

Figure 49:
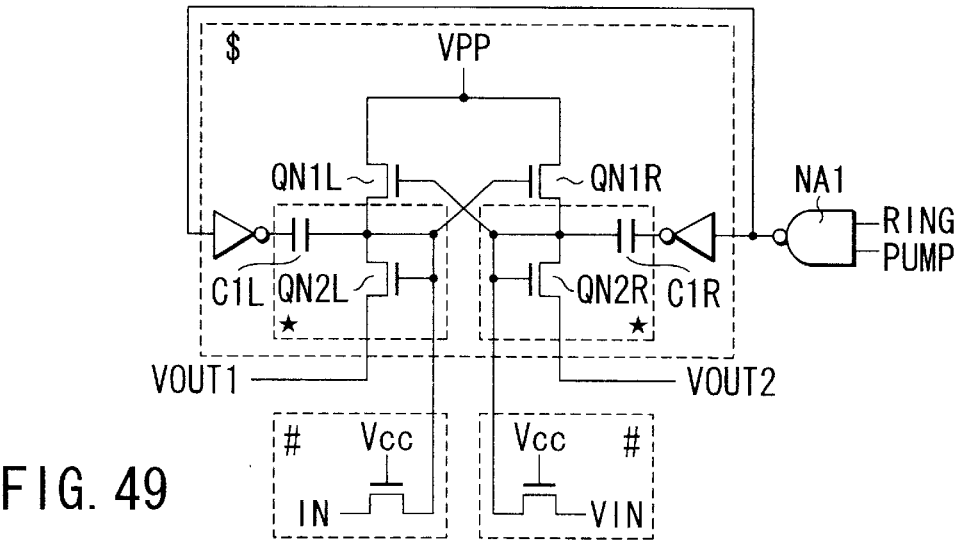
FIG. 49 is a circuit diagram showing a boosted voltage generating/transferring circuit according to the 39th embodiment of the present invention.
Figure 50:
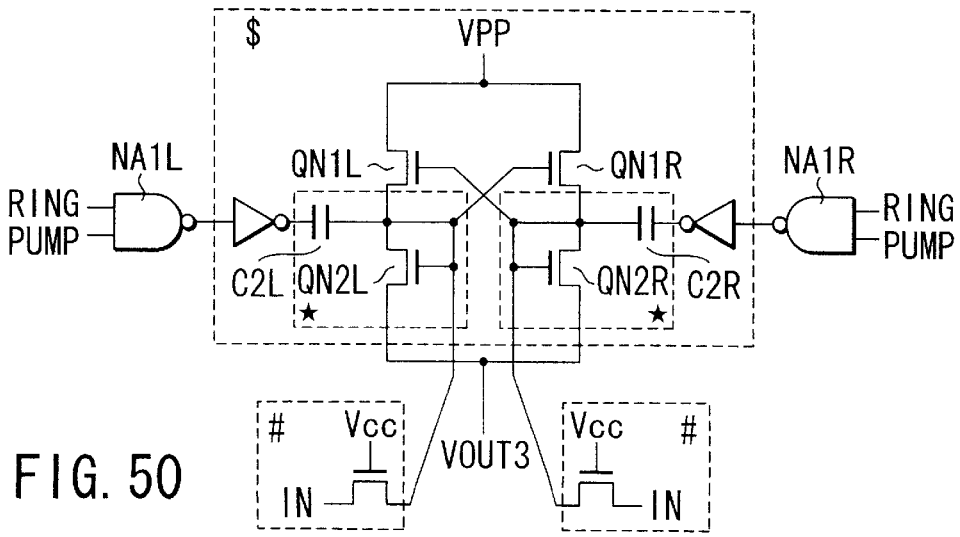
FIG. 50 is a circuit diagram showing a boosted voltage generating/transferring circuit according to the 40th embodiment of the present invention.

FIG. 49 shows a boosted voltage generating/transferring circuit according to the 39th embodiment of the present invention, and FIG. 50 shows a boosted voltage generating/transferring circuit according to the 40th embodiment of the present invention.

The circuit of FIG. 49 is a modification of the circuit of FIG. 23, whereas the circuit of FIG. 50 is a modification of FIG. 24. These circuits are characterized in that right and left boost units receive in-phase oscillation signals.

In this case, condition ② can be satisfied so long as the gates of transistors QN1L and QN1R are connected to the input portions of even-numbered boost units counted from the VPP node (or the output portions of odd-numbered boost units counted from the VPP node). Since the gates of the transistors QN1L and QN1R are connected to capacitors (e.g., capacitors at the input or output portions of the boost units), the maximum gate voltages of the transistors QN1L and QN1R are high, which satisfies condition ①.

Accordingly, these circuits can also achieve high boosting ability of the boost unit, high transfer capacity for the boosted voltage VPP, and a low power supply voltage Vcc.

Figure 51:
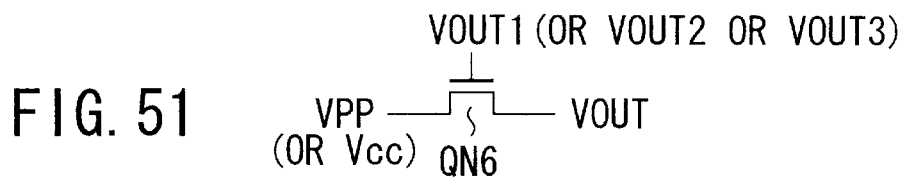
FIG. 51 is a circuit diagram showing a transistor for receiving an output signal from the circuit of FIG. 49 or 50 and transferring a boosted voltage.

Alternatively, as shown in FIG. 51, the output voltages VOUT1, VOUT2, and VOUT3 in the circuits of FIGS. 49 and 50 may be applied to the gate of an N-channel MOS transistor QN6, and the transistor QN6 may be used to transfer the boosted voltage VPP.

[Others]

The present invention has been described in detail. The present invention is not limited to the above 40 embodiments, and can be variously changed.

For example, in the above-described embodiments, all the transistors for receiving the boosted voltage are of N-channel type, but may be of P-channel type. Alternatively, some of transistors for receiving the boosted voltage may be of P-channel type.

In this case, the boosted voltage generating circuit generates a negative boosted voltage -VPP, and the boosted voltage generating/transferring circuit transfers the negative boosted voltage -VPP. This boosted voltage generating/transferring circuit for transferring the negative boosted voltage -VPP can attain high boosting ability of the boost unit, high transfer capacity for the boosted voltage VPP, and a low power supply voltage Vcc.

Figure 52:
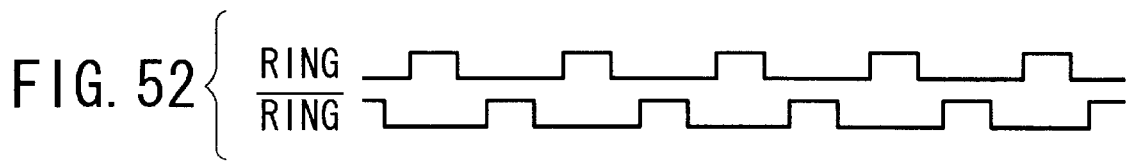
FIG. 52 is a waveform chart showing an example of an oscillation signal input to the boosted voltage generating/ transferring circuit.
Figure 53:
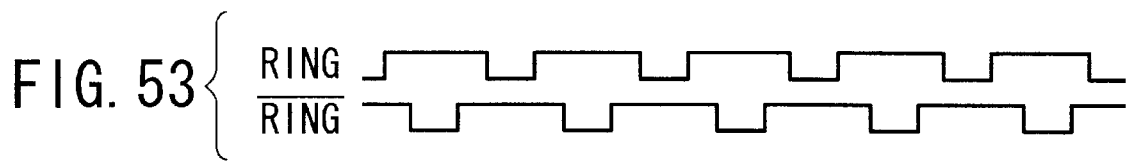
FIG. 53 is a waveform chart showing another example of the oscillation signal input to the boosted voltage generating/ transferring circuit.

The above-mentioned embodiments use two complementary signals (see FIG. 4) of opposite voltage levels. Instead, signals shown in FIG. 52 or 53 may be used.

In this case, condition ② changes to

② The gate and source of the transistor QN1 are driven by different timing signals (the gate of the transistor QN1 is driven by one of RING and /RING, and its source is driven by the other of RING and /RING).

In the present invention, the number of oscillation signals used for boosting operation need not always be two, but may be three or more. The circuit of the present invention can be applied not only to a case wherein the boosted voltage (voltage prepared by boosting the power supply voltage Vcc by the booster) VPP is transferred by the transistor QN6, but also to a case wherein a voltage equal to or lower than the power supply voltage Vcc is transferred.

In the circuit of FIG. 20, the threshold voltage *Vtn of the transistor in the boost unit is set lower than the threshold Vtn of the transistor QN1. However, the threshold of the transistor in the boost unit can be modified as follows.

For example, in the circuit of FIG. 10, the threshold voltage of the transistor *QN7 in the first boost unit counted from the VPP node can be set to *Vtn1, and that of the transistor *QN8 in the second boost unit counted from the VPP node can be set to *Vtn2 (<*Vtn1).

In other words, when a plurality of boost units exist, the threshold voltage of a transistor in a boost unit on the transistor QN6 (node N3) side can be set lower than that of a transistor in a boost unit on the VPP node side.

In this case, the number of types of transistors (threshold voltages) constituting the boosted voltage generating/transferring circuit increases, but the boosting ability of the boost unit on the transistor QN6 side can be enhanced. Accordingly, high transfer capacity for the boosted voltage VPP and a low power supply voltage Vcc can be realized.

Especially, a boost unit closer to the node N3 among a plurality of boost units exhibits higher input and output voltages, and readily degrades in boosting ability. For this reason, decreasing the threshold voltage of a transistor in the boost unit closer to the node N3 is very effective for obtaining the effects of the present invention described above.

If this method is applied to the circuit of FIG. 10, the threshold voltages of the transistors QN1, *QN7, *QN8, and QN6 have a relation of ① *Vtn2 (*QN8)<*Vtn1 (*QN7)<Vtn (QN1, QN6). In the circuit of FIG. 10, the threshold voltages of the transistors QN1, *QN7, *QN8, and QN6 have a relation of ② *Vtn (*QN8, *QN7)<Vtn (QN1, QN6).

This method can be applied not only to the circuit of FIG. 10 but also to circuits each having a plurality of boost units in the 40 embodiments.

Figure 54:
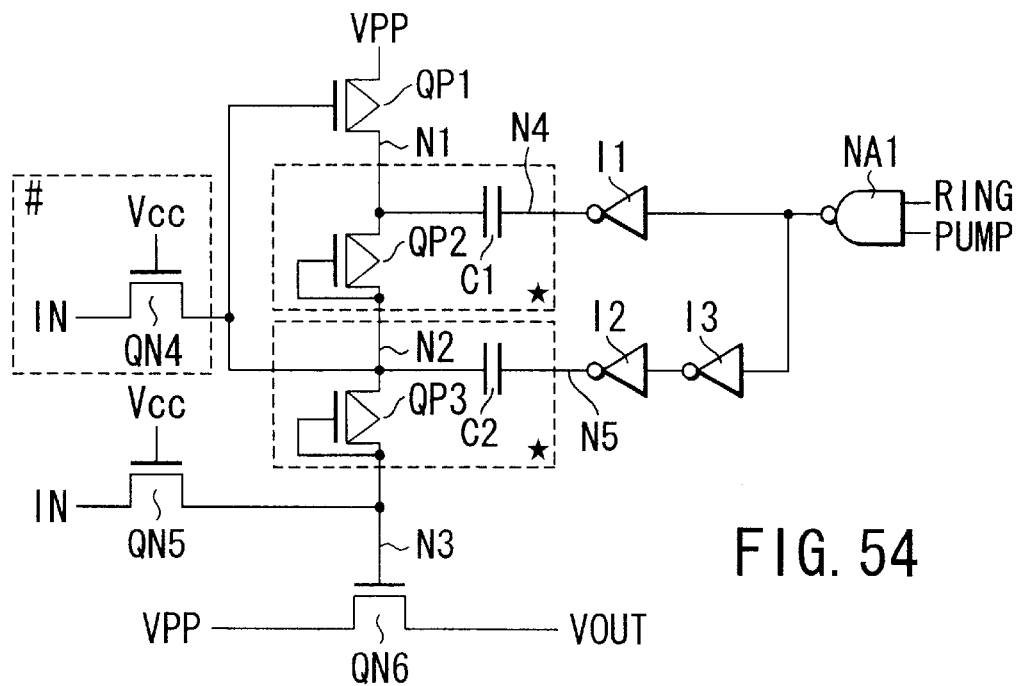
FIG. 54 is a circuit diagram showing an example of a boosted voltage generating/transferring circuit using a P-channel MOS transistor.

FIG. 54 shows an example of a boosted voltage generating/transferring circuit using a P-channel MOS transistor.

The above embodiments concern a boosted voltage generating/transferring circuit using an N-channel MOS transistor, but the present invention can also be applied to a boosted voltage generating/transferring circuit using a P-channel MOS transistor.

In this example, the N-channel MOS transistors QN1, QN2, and QN3 in the boosted voltage generating/transferring circuit of FIG. 3 are replaced by P-channel MOS transistors QP1, QP2, and QP3. In this case, the gate and source (source serves as the output portion of a boost unit) of each of the MOS transistors QP2 and QP3 in boost units (represented by ★) are connected to each other. The power supply voltage Vcc is applied to the gates of MOS transistors QN4 and QN5 in order to transfer the input signal (ground potential) IN to the gate of the MOS transistor QP1 and the nodes N2 and N3 in the OFF state.

This boosted voltage generating/transferring circuit can also achieve high boosting ability of the boost unit, high transfer capacity for the boosted voltage VPP, a low power supply voltage Vcc, and a small circuit area.

Figure 55:
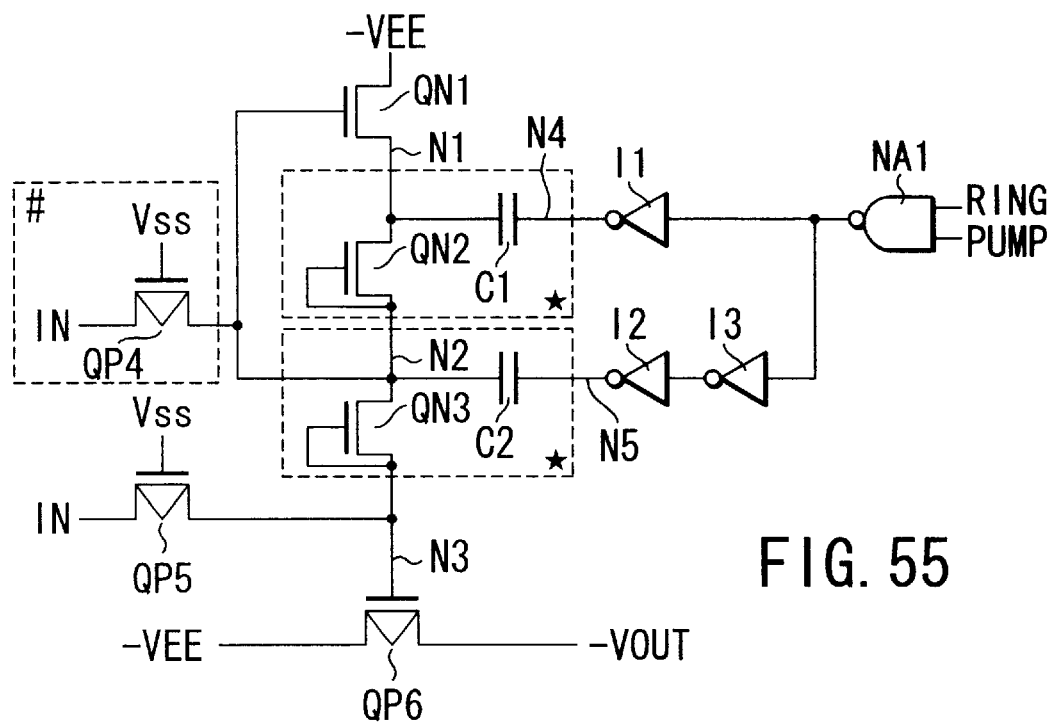
FIG. 55 is a circuit diagram showing an example of a down voltage generating/transferring circuit using an N-channel MOS transistor.

FIG. 55 shows an example of a negative voltage generating/transferring circuit using an N-channel MOS transistor.

The above embodiments relate to a boosted voltage generating/transferring circuit, but the present invention can also be applied to a negative voltage generating/transferring circuit.

In this example, the boosted voltage generating/transferring circuit of FIG. 3 is modified into a negative voltage generating/transferring circuit.

In this case, the gate and source (source serves as the output portion of a down unit) of each of MOS transistors QN2 and QN3 in down units (represented by ★) are connected to each other.

The ground potential Vss is applied to the gates of P-channel MOS transistors QP4 and QP5 in order to transfer the input signal IN to the gate of a MOS transistor QN1 and the nodes N2 and N3 in the OFF state. A P-channel MOS transistor QP6 transfers a negative voltage -VEE.

This negative voltage generating/transferring circuit can also achieve high down ability of the down unit, high transfer capacity for the negative voltage −VEE, a low power supply voltage Vcc, and a small circuit area.

Figure 56:
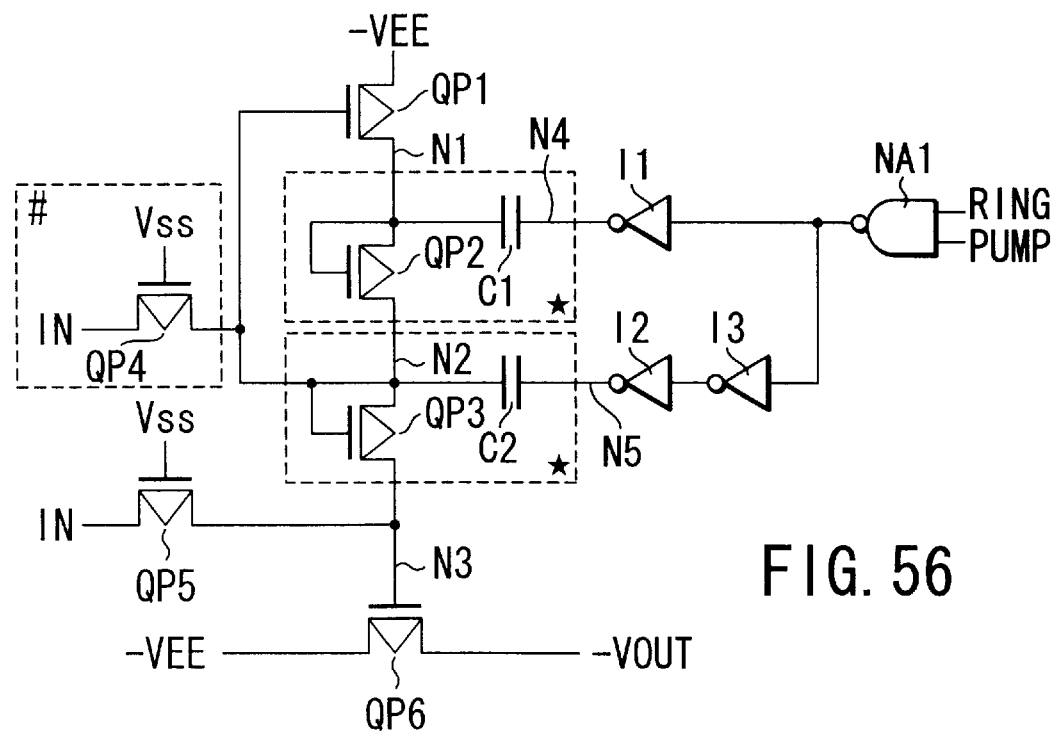
FIG. 56 is a circuit diagram showing an example of a down voltage generating/transferring circuit using a P-channel MOS transistor.

FIG. 56 shows an example of a negative voltage generating/transferring circuit using a P-channel MOS transistor.

The example of FIG. 55 is a negative voltage generating/transferring circuit using an N-channel MOS transistor. The present invention can also be applied to a negative voltage generating/transferring circuit using a P-channel MOS transistor.

In this example, the N-channel MOS transistors QN1, QN2, and QN3 in the negative voltage generating/transferring circuit of FIG. 55 are replaced by P-channel MOS transistors QP1, QP2, and QP3. In this case, the gate and drain (drain serves as the input portion of a down unit) of each of the MOS transistors QP2 and QP3 in down units (represented by ★) are connected to each other. The ground potential Vss is applied to the gates of MOS transistors QP4 and QP5.

This negative voltage generating/transferring circuit can also achieve high down ability of the down unit, high transfer capacity for the negative voltage −VEE, a low power supply voltage vcc, and a small circuit area.

The present invention can be variously modified within the spirit and scope of the invention.

CONCLUSION

As has been described above, according to the present invention, the boosted voltage generating/transferring circuit can achieve high boosting ability of the boost unit, high transfer capacity for the boosted voltage VPP, a low power supply voltage Vcc, and a small circuit area. Along with this, a semiconductor integrated circuit (e.g., EEPROM) using the boosted voltage generating/transferring circuit of the present invention can realize high-speed operation and a small chip area, and has a wide operable power supply voltage range.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A voltage generating/transferring circuit comprising:
   a boost unit group including a plurality of boost units series-connected between input and output nodes; and
   a first transistor connected between the input node and a node for receiving a first voltage,
   wherein each boost unit has input and output portions, a second transistor having a gate and a drain connected to the input portion and a source connected to the output portion, and a capacitor connected to the input portion, a charge moves between the output portion of one of the boost units and the input portion of another of the boost units, and a gate of said first transistor is connected to the input portion of one of the boost units.

2. A voltage generating/transferring circuit according to claim 1, wherein the gate of said first transistor is connected to the input portion of a second or subsequent boost unit from the input node among the plurality of boost units.

3. A voltage generating/transferring circuit according to claim 2, wherein the gate of said first transistor is connected to the input portion of an even-numbered boost unit from the input node among the plurality of boost units.

4. A voltage generating/transferring circuit according to claim 1, further comprising:
   a third transistor which has a gate connected to the output node, and transfers a third voltage,
   wherein a second voltage of the gate of said third transistor is equal to, or larger than a sum of the third voltage and a threshold voltage of said third transistor.

5. A voltage generating/transferring circuit according to claim 1, wherein a first oscillation signal is input to an even-numbered boost unit from the input node, a second oscillation signal is input to an odd-numbered boost unit from the input node, and the first and second oscillation signals have opposite phases or different timings.

6. A voltage generating/transferring circuit according to claim 1, wherein gate and source voltage levels of said first transistor gradually rise while changing in opposite phases.

7. A voltage generating/transferring circuit according to claim 1, further comprising:
   a circuit for fixing the gate of said first transistor to low level in an OFF state.

8. A voltage generating/transferring circuit according to claim 1, wherein a threshold voltage of the second transistor in at least one of the boost units is lower than a threshold voltage of said first transistor.

9. A voltage generating/transferring circuit according to claim 8, wherein a transistor having a threshold voltage lower than the threshold voltage of said first transistor is arranged in a boost unit closest to the output node.

10. A voltage generating/transferring circuit according to claim 1, wherein a threshold voltage of a transistor in a boost unit on the output node side is lower than a threshold voltage of a transistor in a boost unit on the input node side.

11. A voltage generating/transferring circuit comprising:
    a boost unit group including at least a first boost unit and a second boost unit series-connected between input and output nodes; and
    a first transistor connected between the input node and a node for receiving a first voltage,
    wherein each of said first and second boost units has an input portion, an output portion, a second transistor having both a gate and a drain connected to the input portion and a source connected to the output portion, and a capacitor connected to the input portion, the source of the second transistor of said first boost unit being directly connected to the input portion of said second boost unit, and a gate of said first transistor being connected to the input portion of one of said first and second boost units.

12. The voltage generating/transferring circuit of claim 11, wherein the gate of said first transistor is directly connected to the input portion one of said first and second boost units.

* * * * *

UNITED STATES PATENT AND TRADEMARK OFFICE
CERTIFICATE OF CORRECTION

PATENT NO.   : 6,373,327 B1  
DATED        : April 16, 2002  
INVENTOR(S)  : Hiroshi Nakamura Page 1 of 1

It is certified that error appears in the above-identified patent and that said Letters Patent is hereby corrected as shown below:

<u>Title page,</u>
Item [73], Assignee: "Kanagawa-ken" has been replaced with -- Kawasaki-shi --.

Signed and Sealed this

Fourth Day of February, 2003

JAMES E. ROGAN
*Director of the United States Patent and Trademark Office*